US007260587B2

United States Patent
Testa et al.

(10) Patent No.: US 7,260,587 B2
(45) Date of Patent: Aug. 21, 2007

(54) METHOD FOR ORGANIZING DIGITAL IMAGES

(75) Inventors: Carl A. Testa, Rochester, NY (US); Andrew Sailus, Brockport, NY (US); Kenneth D. Corby, Rochester, NY (US); Leanne M. Capozzi, Ontario, NY (US); Dale F. McIntyre, Honeoye Falls, NY (US); Joseph A. Manico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 64 days.

(21) Appl. No.: 10/744,537

(22) Filed: Dec. 22, 2003

(65) Prior Publication Data
US 2004/0139398 A1    Jul. 15, 2004

Related U.S. Application Data

(62) Division of application No. 09/640,642, filed on Aug. 17, 2000, now Pat. No. 6,745,186.

(51) Int. Cl.
*G06F 17/30* (2006.01)

(52) U.S. Cl. .................... 707/104.1; 707/100

(58) Field of Classification Search ............ 707/104.1, 707/1, 100; 715/500–507, 517; 358/505, 358/506; 705/26, 27; 355/40; 382/181, 382/224
See application file for complete search history.

(56) References Cited

U.S. PATENT DOCUMENTS

| | | | | |
|---|---|---|---|---|
| 4,771,551 | A * | 9/1988 | Hiroshima et al. | 33/615 |
| 5,406,325 | A * | 4/1995 | Parulski et al. | 348/97 |
| 5,572,633 | A * | 11/1996 | Lo et al. | 358/1.18 |
| 5,607,063 | A * | 3/1997 | Nishijima et al. | 209/584 |
| 5,706,457 | A * | 1/1998 | Dwyer et al. | 715/835 |
| 6,123,362 | A * | 9/2000 | Squilla et al. | 283/67 |
| 6,141,111 | A * | 10/2000 | Kato | 358/1.15 |
| 6,563,598 | B1 * | 5/2003 | Johnson et al. | 358/1.15 |
| 6,745,186 | B1 * | 6/2004 | Testa et al. | 707/7 |

* cited by examiner

*Primary Examiner*—Cheryl Lewis
(74) *Attorney, Agent, or Firm*—Frank Pincelli

(57) ABSTRACT

A computer software product and a method of organizing and searching images. The digital images may be obtained from a plurality of hard copy prints that are digitally scanned. The digital image are analyzed in accordance with a predetermined criteria based on the information obtained by scanning of the images and categorizing in accordance with the predetermined criteria. At least one goods and/or services may be provided in accordance with the predetermined criteria.

18 Claims, 29 Drawing Sheets

52

CUSTOMER INSTRUCTIONS

THIS KIT INCLUDES:

PRE-PRINTED LABELS

CONTAINER

PRINT COUNT ESTIMATING TOOL

ENVELOPES

ORDER SHEET

INSTRUCTION CARD

54

GETTING ORGANIZED!

STEP #1

STEP #2

FIG. 3

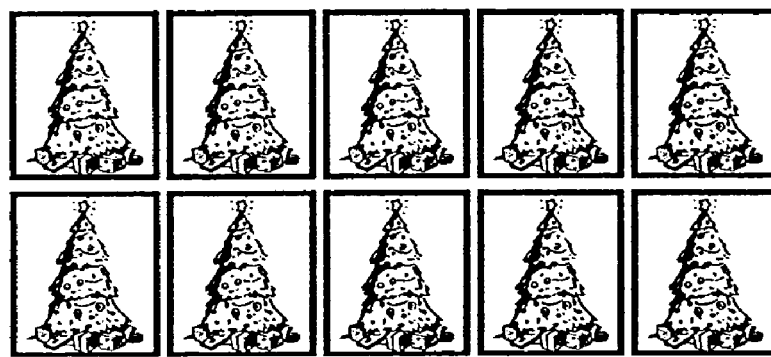
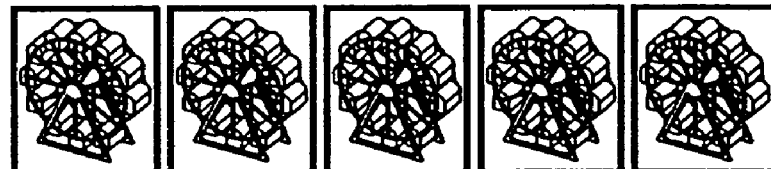
FIG. 6B

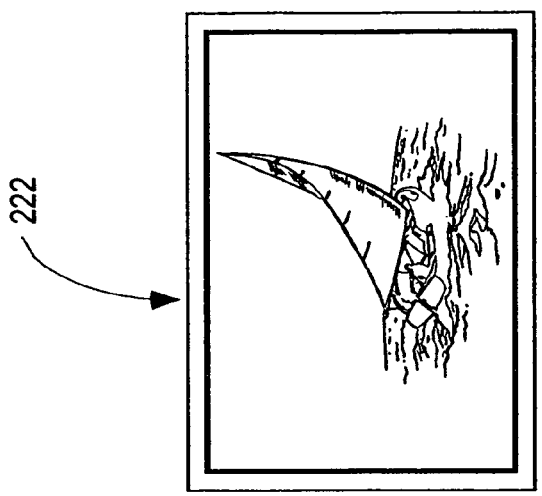
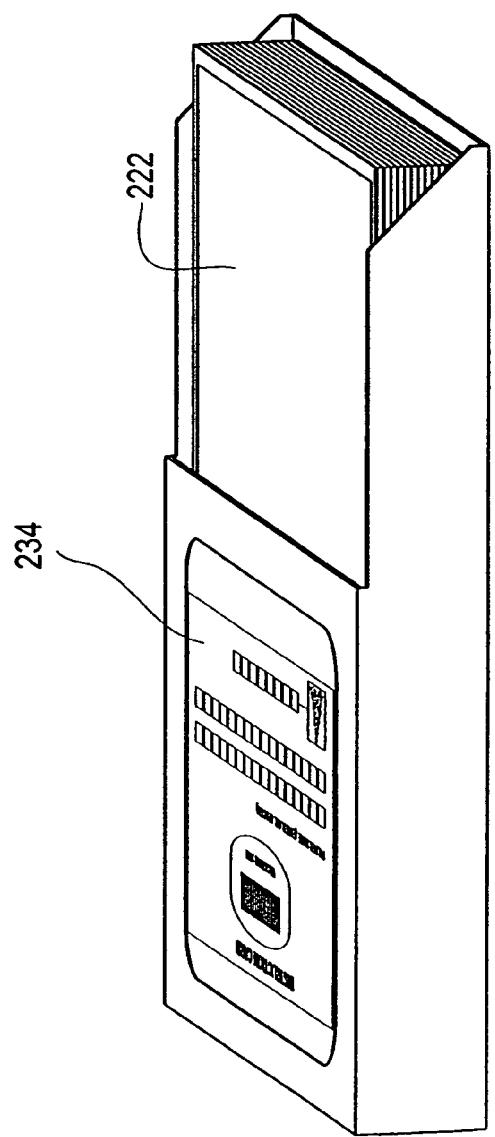
FIG. 17C

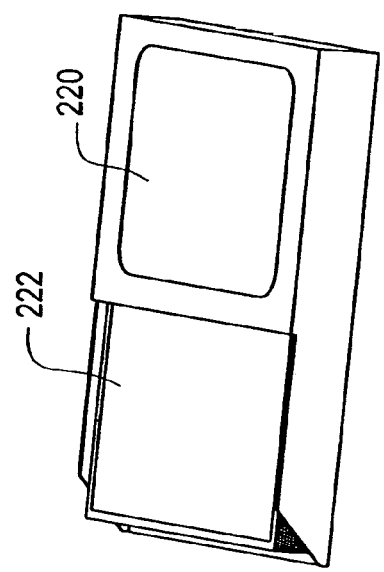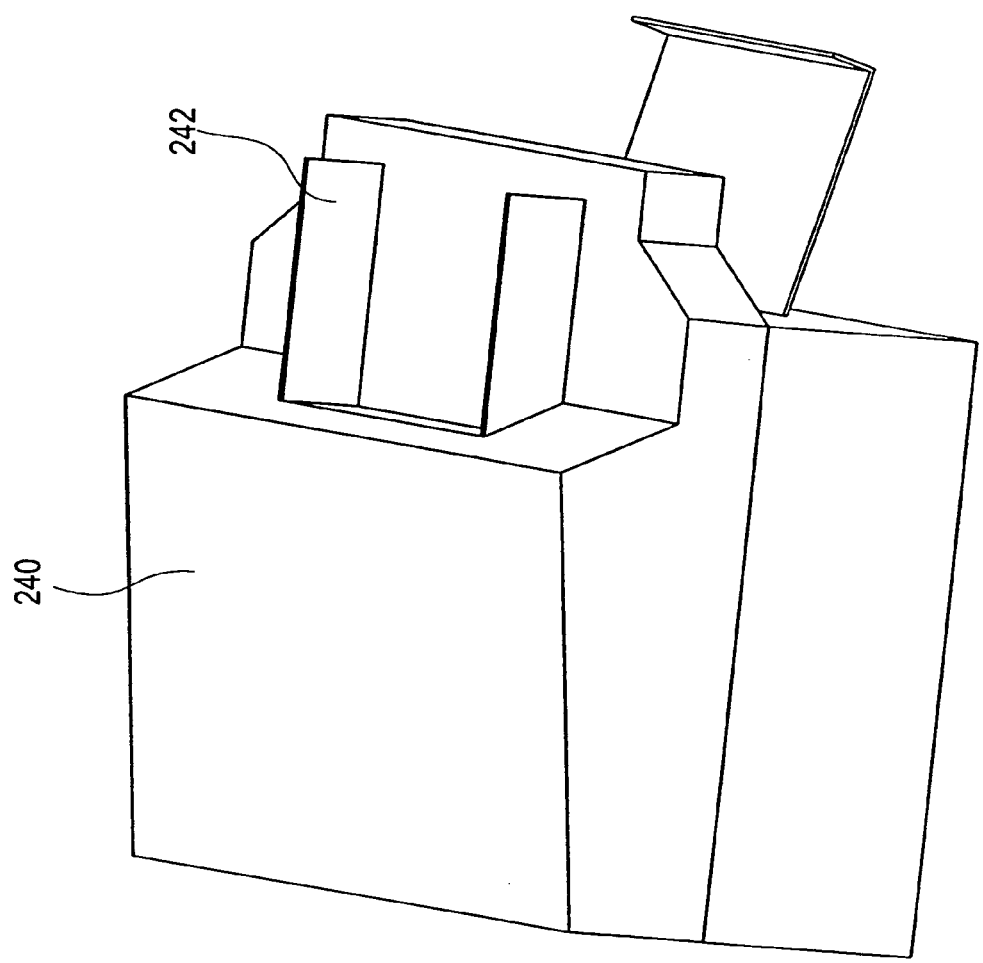
FIG. 17D

FIG. 24

METHOD FOR ORGANIZING DIGITAL IMAGES

CROSS REFERENCE TO RELATED APPLICATIONS

This is a divisional of application Ser. No. 09/640,642 now U.S. Pat. No. 6,745,186, filed Aug. 17, 2000 of Carl A. Testa, Andrew Sailus, Kenneth D. Corby, Leanne M. Capozzi, Dale F. McIntyre, Joseph A. Manico, entitled A METHOD FOR ORGANIZING DIGITAL IMAGES.

Reference is made to commonly assigned, co-pending applications U.S. Ser. No. 09/641,030, filed Aug. 17, 2000, of Leanne M. Capozzi, Andrew Sailus, Kenneth D. Corby, Carl A. Testa and Dale F. McIntyre, entitled "A KIT FOR USE IN ORGANIZING IMAGES"; U.S. Ser. No. 09/640,807, filed Aug. 17, 2000, of Kenneth D. Corby, Andrew Sailus, Carl A. Testa, Leanne M. Capozzi and Dale F. McIntyre, entitled "METHOD APPARATUS AND SYSTEM FOR ORGANIZING CAPTURED DIGITAL IMAGES"; U.S. Ser. No. 09/641,102 now U.S. Pat. No. 6,873,336, filed Aug. 17, 2000, of Andrew Sailus, Kenneth D. Corby, Carl A. Testa, Leanne M. Capozzi, Allen K. Tsaur and Dale F. McIntyre, entitled "A COMPUTER SOFTWARE PRODUCT AND METHOD FOR ORGANIZING AND MANIPULATING OF IMAGES"; and U.S. Ser. No. 09/640,949, filed Aug. 17, 2000, of Andrew Sailus, Kenneth D. Corby, Carl. A. Testa and Leanne M. Capozzi entitled "A SYSTEM FOR DETERMINING THE COSTS OF GOODS AND SERVICES THAT HAVE BEEN ORGANIZED".

FIELD OF THE INVENTION

The present invention relates to the organizing of images. In particular to a method, system and apparatus for automatically organizing a large number of images that may be obtained from a variety of different sources.

BACKGROUND OF THE INVENTION

For years consumers have been taking pictures. Up until recently most pictures were produced as hard copy prints. These prints were taken at various personal and professional occasions, often having great sentimental value to the taker and the people associated therewith. Often these pictures would be taken and viewed shortly thereafter. Due to the relatively inexpensive nature of taking photographs, people have often taken many photographs over the years. While some attempts have been made in trying to organize the images and pictures taken by consumers, often due to the extensive amount of pictures taken, the photographic prints are stored into various containers such as shoe boxes in random fashion. Thus, over the course of many years, people often store hundreds of pictures in boxes where the images are not placed in any particular order or organization. While some attempts have been made to allow organization of newly captured images, very little has been done with regard to stored hardcopy print images. They are simply stored in shoeboxes. Typically, the only thing available for sorting and organizing of these images is for the consumer to go through the pile of stored pictures and manually place individual pictures into photo albums. This is a difficult and arduous process. Thus, little headway is usually made in organizing these photographic prints. Further, there is no easy way of organizing the past prints with new prints that are taken. Typically, images must be sorted with respect to the time frame to which they are taken. There is no easy way of being able to sort and organize images that have been taken over an extended period of time or from a variety of sources, for example, multiple rolls of film. In addition, there is no easy way for organizing images from different types of sources, such as, digital images that are stored on line, in cameras, photographic prints etc.

Thus, there is a need to provide a method and system for the organizing of images by consumer.

SUMMARY OF THE INVENTION

In accordance with one aspect of the present invention, there is provided a method of organizing a plurality of hard copy prints, each of said hard copy prints having an image thereon, comprising the steps of:

placing said hard copy prints into a desired order;

digitally scanning said hard copy prints in said desired order; and providing a product or service wherein said plurality of digitized images are grouped in the order in which they have been scanned.

In accordance with yet another aspect of the present invention, there is provided a method a method of organizing a plurality of images provided on a plurality of separate hard copy prints, comprising the steps of:

placing said hard copy prints into a desired order;

placing in front of at least one of said hard copy prints an instruction form capable of being scanned;

scanning said hard copy prints so as to obtain a digital record of said images on said hard copy prints;

scanning said instruction form so as to obtain information provided on said instruction form.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which:

FIG. 3 illustrates an instruction sheet for use in a kit made in accordance with the present invention;

FIG. 6B illustrates a sheet having paired sticker icons;

FIG. 17a-d illustrates a modified container in various positions for holding hard copy documents which is designed to mate with a scanner;

FIG. 24 is a plan view of a display screen on a display device.

DETAILED DESCRIPTION OF THE INVENTION

Figure 1:
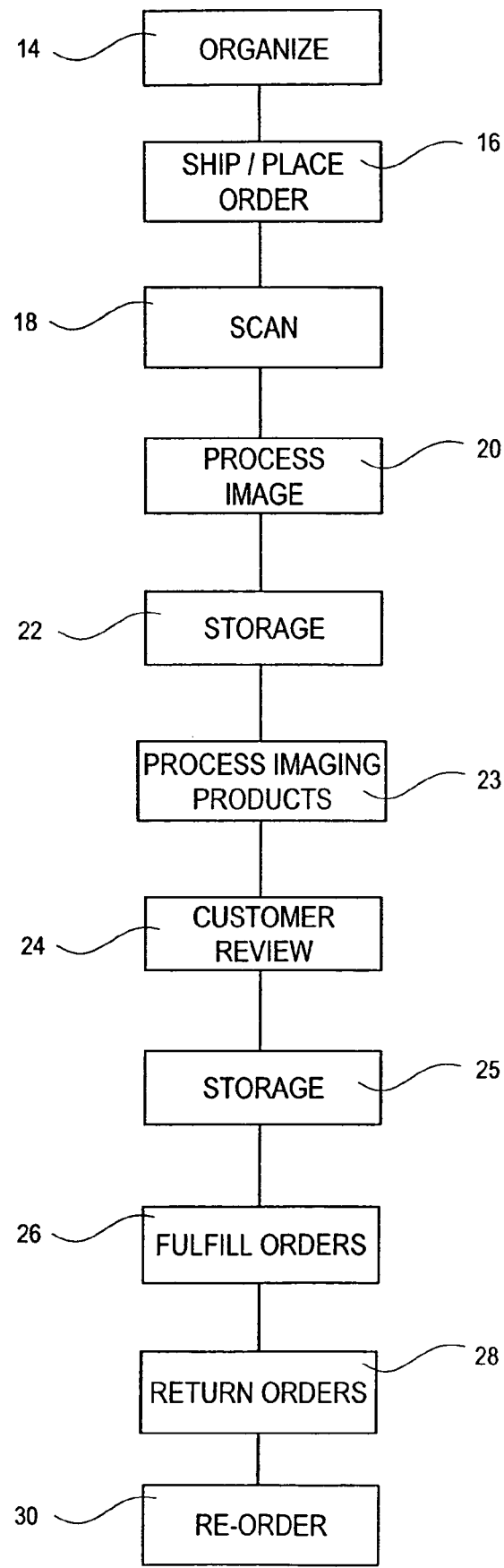
FIG. 1 is flow chart of a system made in accordance with the present invention.

Referring to FIG. 1 there is illustrated a flow chart of the various steps in a system for organizing images in accordance with the present invention. The first step 14 comprises the obtaining and organizing of the images. The images may be obtained from a variety of different sources. The images may be obtained by digital scanning of hard copy documents such as photographic prints, film negatives, document drawings etc. A second source from which images can be obtained may be from digital sources such as digital cameras, photo CDs, computer disks, E-mail and on-line sources.

After the appropriate images have been obtained, they are organized. If the images are in the form of hard copy prints they can be digitally scanned so as to obtain a digital record of the images and then organized. An automatic scanner such as described in co-pending U.S. Ser. No. 09/641,103 now U.S. Pat. No. 6,785,024, filed concurrently herewith entitled "Digital Scanner", of Kenneth D. Corby et al. which is hereby incorporated by reference. However, if the hard-copy prints are organized in groups (categories) by the customer prior to scanning, the scanning can proceed more efficiently and minimize further organization down the line thus significantly reducing the cost to organize the images. In addition the scanning process may be used to provide instructional and additional information to be implemented or associated with the hard copy images. Various methods by which these hard copy prints may be organized will be discussed in further detail later herein.

The next step 16, after the images have been obtained and organized, is for a customer to place an order for goods and/or services as desired. The output goods and/or services can take a variety of forms, for example but not by way of limitation, CDs having images, photo-album pages, images uploaded to the Internet for access by customer and third parties, reprints, creative gifts, such as T-shirts, mugs etc. wherein personal images are placed or for any other service or product that might be deemed appropriate. These orders may be placed by the customer at a variety of locations and by various manners. For example, they can be placed by simply filling out a form or by a retail representative taking the customer order personally or by having the order obtained at the same time images are being scanned. Additionally, orders may be placed over the Internet, by phone or by any other appropriate means as will be discussed later on herein.

At step 18, the digital images of the images provided at step 14 are obtained by a service provider. The digital images may be obtained by scanning of the hard copy prints, slides, negatives, and other memorabilia, received over the Internet or obtained from other digital memory devices having digital images. A more detailed description on how the images in step 18 may be obtained is also discussed later herein.

After the obtainment of the image data at step 18, at step 20 the images are processed in accordance with the customer order. This includes the digital manipulation of the digital images and/or the obtainment of associated information. Some examples, but not by way of limitation, would be, red-eye removal, auto-grouping, texturing, adding of content and meta-data and then sent to digital storage at step 22.

After step 22, the digital images may be sent to for producing of a product or service at step 23 or sent in digital form for later use by the service provider and/or for allowing the customer to have access at step 24. For example, at step 24, the digital storage image may be reviewed by the customer or a professional for determining whether or not additional customization is required. For example, such review may be accomplished by providing to the customer with a proofing set of the proposed products to be produced and allowing the customer to make final selections as to the goods and/or services to be ordered. After review by the customer the digital data can be sent to storage at step 25.

At step 26, the ordered goods and/or services are then produced or provided in accordance with the order instructions and any additional instructions obtained during any review that may have taken place. As previously discussed, the final output can take a variety of forms and will be discussed in greater detail later herein.

At step 28, the customer receives the ordered the output goods and/or services. The organized supplied source documents are also returned to the customer.

At step 30, the customer may then place an additional order or reorder of the images that have been stored at step 22. Because the images have been stored in digital format, the ordering and/or reorganizing of the images may be enabled in a quick and efficient manner.

In order to better understand the present invention, each of the above steps will now be discussed in greater detail.

Referring to step 14, various methods are available for obtaining of images. As previously discussed, the initial images provided may be hard copy prints/documents which come in a variety of different forms or the images may be provided in digital (electronic) form. Also during this phase, personal data for entering of these orders may be obtained, for example, the name, phone number, address of the customer and method of payment. If payment is to be by credit card, a credit card number may also be provided. A customer billing account may be established or confirmed. Once, the customer has established and decided on what is to be ordered and what images are going to be obtained from the desired sources, the next step would be to organize the images.

Figure 2:
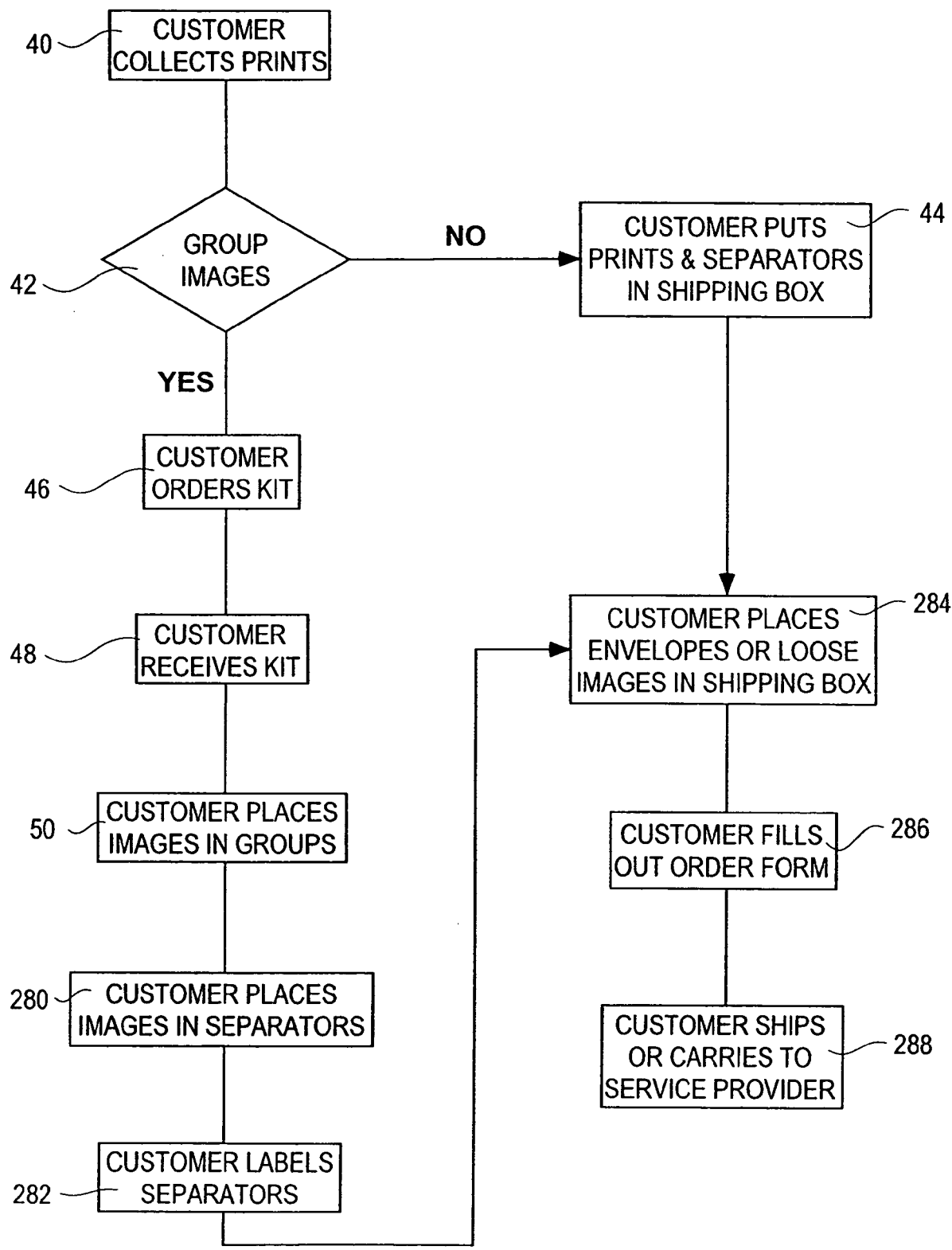
FIG. 2 is a flow chart of one of the steps in the system of FIG. 1.

Referring to FIG. 2, there is illustrated a flow chart of the organizational step 14. In the first step 40, a customer gathers the desired images. In the particular embodiment illustrated, the customer may gather hard copy prints, such as photographic prints, and organizing according to desired categories. However it is to be understood that the customer is not limited to providing of hard copy prints, and the images may be provided in a variety of different formats. For example but not by way of limitation, film, compact disc, camera memory card, digitally over a communication network. However, for the sake of simplicity in describing the present invention, the following discussion will be directed a system wherein the images provided in the form of hard copy prints that are capable of being digitally scanned.

In the illustrated method, the next step 42 would be for the customer to group the hard copy images into desired classifications (categories) at step 42. This grouping at this point while not necessary may prove very useful in minimizing cost and later organization by the customer. Preferably the images are grouped in the order in which they will be scanned. The customer need not provide this grouping if it is of no interest to the customer. After the customer has completed the desired grouping, if any, the hard copy prints are placed into a shipping box at step 44 and delivered to a service provider. The service provider could simply be a retail establishment in the business of providing photofinishing services.

Figure 24:
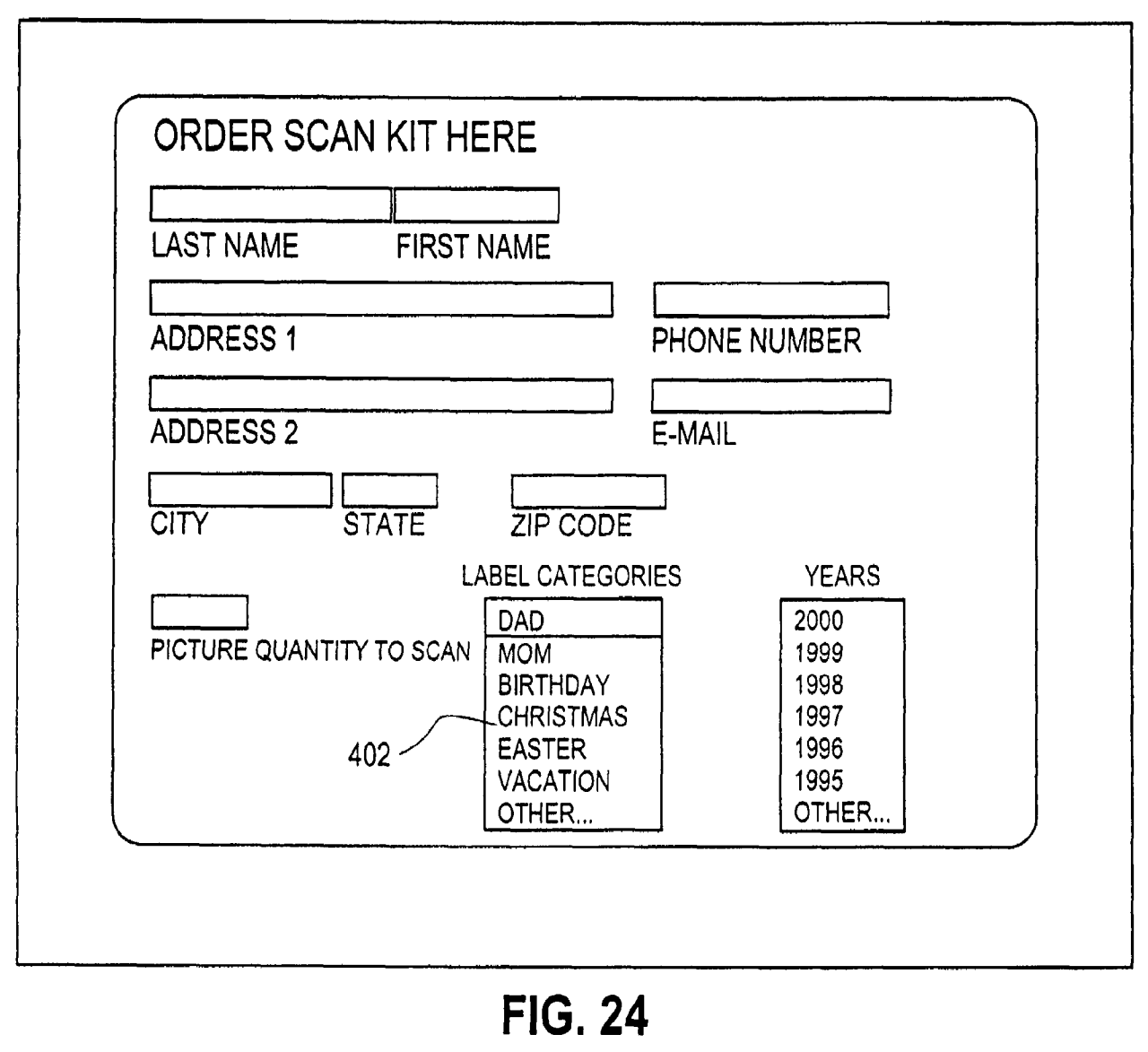

If the customer desires to group the images into desired categories, the customer would obtain a customer's organizing kit at step 46. This may be done by ordering the kit through the mail, over the phone, over the Internet or simply picking up a customer order kit at a retail establishment. If the kit is ordered from the internet, a simple Hyper Text Markup Language (HTML) form can be provided which permits the customer to input content specific to that customer which are to be printed on labels that are delivered with the kit. FIG. 24 illustrates an example of a screen display that could be electronically transmitted to the user. As illustrated the user can order the desired categories from list 402 or even customize personal categories by the selection of the "Other" category in list 402. After customers receive the kit labels that are provided in the kit, the customer may add other valuable information such as the "who", "what", "when" and "why" related to the images. These labels may be preprinted with common categories or left blank for the customer to provide customized categories by writing in the desired information. This added information allows the customer to organize and easily search for specific images when this informational data is saved with the images.

At step 48 the customer receives the kit and at step 50, the customer places the images in the desired groups which may be established by the customer and/or selected from a plurality of predefined categories such as stickers.

FIGS. 3-20, there is illustrated various kits and parts of kits that may be used in organizing images and for ordering of related goods and/or services.

Referring to FIG. 3 there is illustrated a customer instruction sheet (form) 52 for use in a kit in accordance with the present invention. The instruction sheet includes various types of information 54 printed thereon. For example, the information 54 can include what is included in the kit. In the particular embodiment illustrated, the kit may include pre-printed labels, a container, envelopes, order sheets, order form and an image instruction form. While in the particular embodiment illustrated, the instructions would typically be provided on a hard copy document, the instructions may be provided in an audio or visual format.

Figure 4:
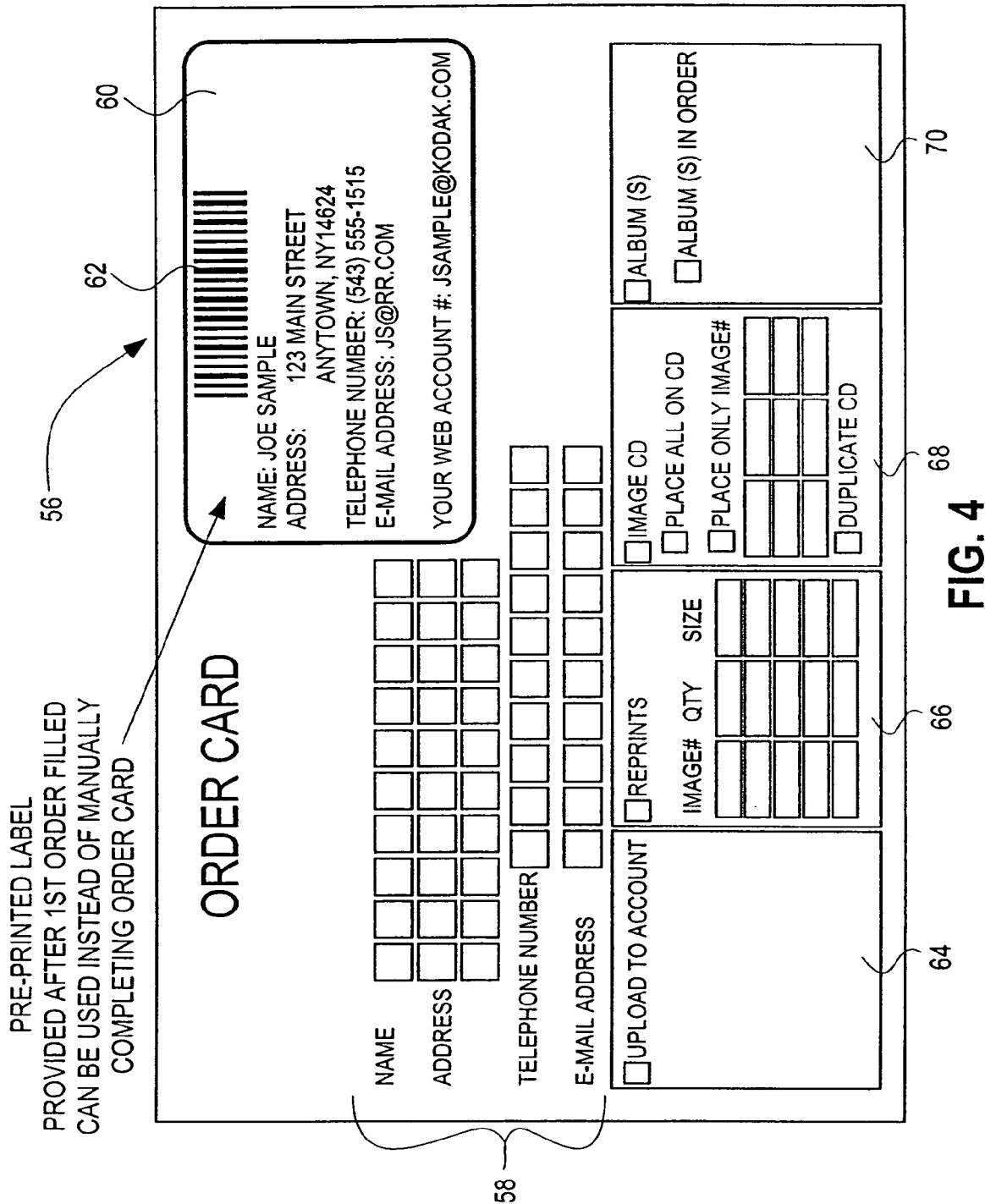
FIG. 4 illustrates an order form (card) for use in a kit made in accordance with the present invention.

FIG. 4 illustrates an order form 56 that would be used in ordering goods and/or services with respect to the images being submitted. As can be seen, the order form 56 includes an area 58 whereby identifying information of the customer may be placed herein. Such information may include, but not by way of limitation, name, address, telephone number and e-mail address. In the particular embodiment illustrated, an order form 56 may be provided with a pre-printed label 60 having the same human readable information, but in addition, includes a machine readable barcode 62 which can be used by order scanning equipment for automatically obtaining the personal information of the customer in a quick and efficient manner. The order form 56 includes an additional area for providing instructions as to what is to be done with the digital images that are obtained. In the particular embodiment illustrated, four options are provided for. The first option 64 is to upload the images to an e-mail storage account. A second option 66 is for ordering of hard copy prints of the images. An appropriate space is provided for identifying the quantity and size of the hard copy prints. It is of course understood that any desired format may be used for ordering an image of any particular type and size. Third option 68 allows for the images to be provided on a CD (compact disc) product whereby all or some of the images may be placed. The CD may be a new or existing CD. The last option 70 is for ordering album pages of the images. Option 70 may include simply placing the images in the album pages in the order that they were organized in the organizing kit. It is of course understood that any desired types of goods and/or services may be provided.

Figure 5:
FIG. 5 illustrates a modified order form for use in a kit made in accordance with the present invention.

Referring to FIG. 5, it is a modified order form 72. The order form 72 is similar to that order form 56 with like numerals indicating like parts and operations. In this embodiment the order form 72 includes the ability for providing instructions in a machine readable form so that it can be scanned and automatically implemented. In particular, the instructions may be provided on a computer storage medium such as a floppy disk submitted with the order form 72. Additionally the instruction software may be located at a designated E-Mail address which can be addressed over the internet or other communication net work. Instructions may be provided, as discussed later herein, by a software program provided by the service provider to the customer such that the instructions will be in a format that can be scanned and associated with the images provided therewith.

Figure 6A:
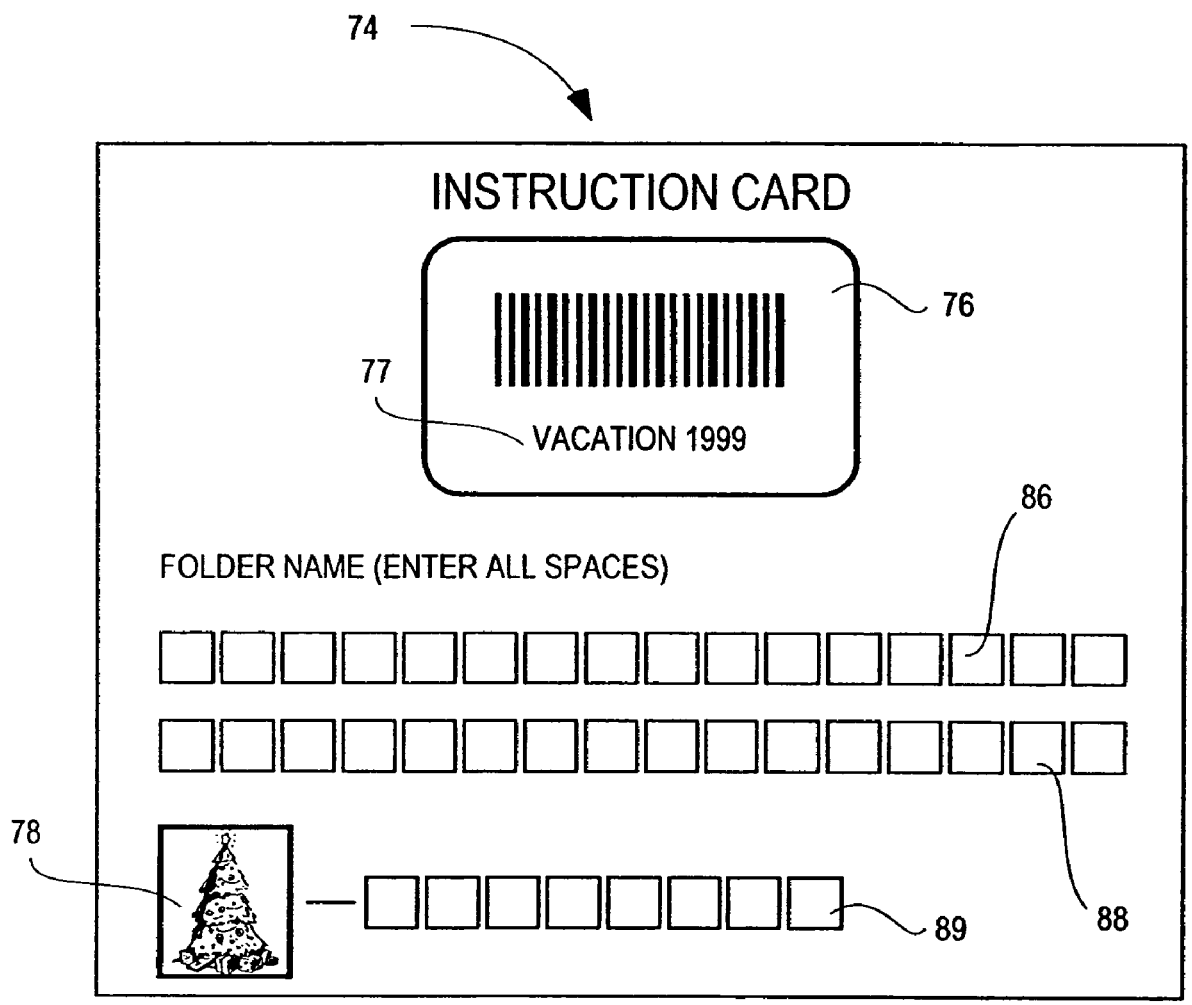
FIG. 6A illustrates an instruction form for use in a kit made in accordance with the present invention.

Referring to FIG. 6A, there is illustrated an image instruction form 74. The image instruction form 74, in the embodiment illustrated, is designed to be scanned for obtaining the information thereon. The form 74 is preferably placed in front of a single hard copy print or group of hard copy prints that are to be scanned. The image instruction form 74 has a machine readable code 76 that provides meta-data regarding the image or images that follow. In the particular embodiment illustrated, the code 76 would state that the images are associated with "vacation 1999". The code 76 may take a variety of machine readable forms, for example: a bar code, two dimensional code, or even a color which is representative of a code. This information would be associated with grouped images that follow. As illustrated, a human readable text 77 of what is present in code 76 is also provided for the convenience of the customer and also serves as a check on what the code 77 will provide. The instruction form 74 also has a location 78 whereby an event or other personal information can be associated therewith. For example, a pre-printed sticker form 80, as illustrated by FIG. 6B, may be provided having a plurality of sticker icons 82, 83, 84 each indicating a particular event. For example, the sticker icons 82 indicate that the image is to be associated with a birthday, sticker icon 83 is associated with a holiday such as Christmas, and sticker icon 84 is associated with a place such as a theme park. These icons may have been obtained from a theme park or other place that has pre-registered with the service provider the icon and what it is to be associated with the icon. Icon stickers have meta-data associated with them including but not limited to information such as statistics related to the park, statistics related to specific rides like the roller coaster, park location etc. Pre-printed labels representing common data would be linked so that all associated images would end up in a common location or folder. Thus when the icon is scanned, preprogrammed information may be associated with the image or images. It is of course to be understood that the sticker icons may be associated with a variety of different events, individuals, or places not illustrated. A single event icon will be placed on the instruction form and that meta-data will be associated with the images that follow the instruction card. The icon is of such a nature that it can be read during scanning and or automatically associated with an image.

The image instruction form 74 of FIG. 6A also includes writing areas 86, 88 and 89 for providing of information that can be read by either a human or a machine and added as meta-data with regard to the images that follow. A single letter is handwritten into each block of these writing areas 86, 88, and 89. When the image instruction form 74 is scanned prior to the group of hardcopy prints, commonly available software can be employed to convert the handwritten letters of writing areas 86, 88, and 89 into ASCII characters for storage as meta-data associated with the scanned hardcopy prints. This software technique is called optical character recognition (OCR) and is well known in the scanning art. This recognized meta-data is then applied to all digital files resulting from scanning all the hardcopy prints that follow image instruction form 74 until another image instruction form 74 is encountered with new meta-data is presented. Handwritten instructions entered into writing areas 86, 88, and 89 can also be recognized via OCR as instructions on how the image is to be manipulated. For example instructions may be provided for the addition of text and where the text should be placed.

Figure 7:
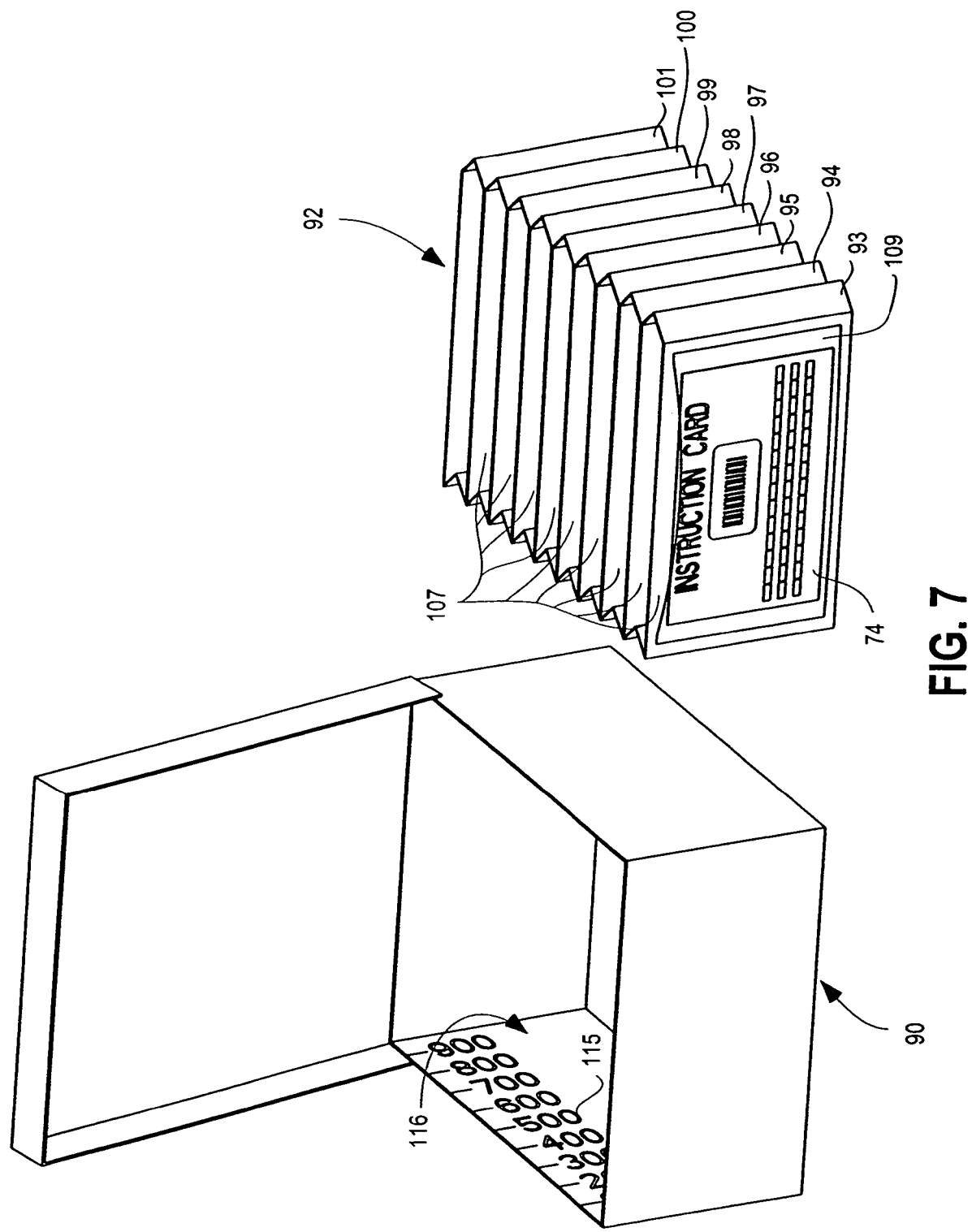
FIG. 7 illustrates a container and an organization folder for use in a kit made in accordance with the present invention.

Referring to FIG. 7, there is illustrated Kit comprising an organizing container 90 and organizing holder 92 that is to be placed in container 90. The holder 92 is an expandable type holder having a plurality of retaining sections 93, 94, 95, 96, 97, 98, 99, 100 and 101. The sections 93-101 are each separated by a divider 107. An instruction form such as 74 may be associated with each of the sections 93-101. In the particular embodiment illustrated, a pocket 109 is provided on a holder 92 for receipt of instruction form 74 associated with pocket 109. A similar type pocket may be provided for each of the associated sections 93-101. Once having completed organization of the hard copy prints into the various categories, each associated with an instruction form 74, the holder 92 with the enclosed photographic prints, are placed in the container 90 which is then handed over to a service provider as discussed later herein. In this embodiment matched pairs of identification sticker 112 (FIG. 9) may be provided. One of the matched identification stickers 113A will be placed on dividers 107 (or other container) containing the images to be scanned and the other sticker 113b of the matched pair of stickers can be placed with the original source from which the image was taken so that the scanned images can be reunited with the original source when returned to the customer. It is of course to be understood that any number of matched pairs of stickers may be provided and used by the customer.

In the embodiment of FIG. 7 there is provided a scale 115 provided along the inside surface 116 of container 90. The scale 115 is designed to advise the user of the approximate number of hard copy prints that has been placed in container 90. In the particular embodiment, illustrated the scale 115 is designed to advise the number of photographic prints that have been placed therein.

Figure 8:
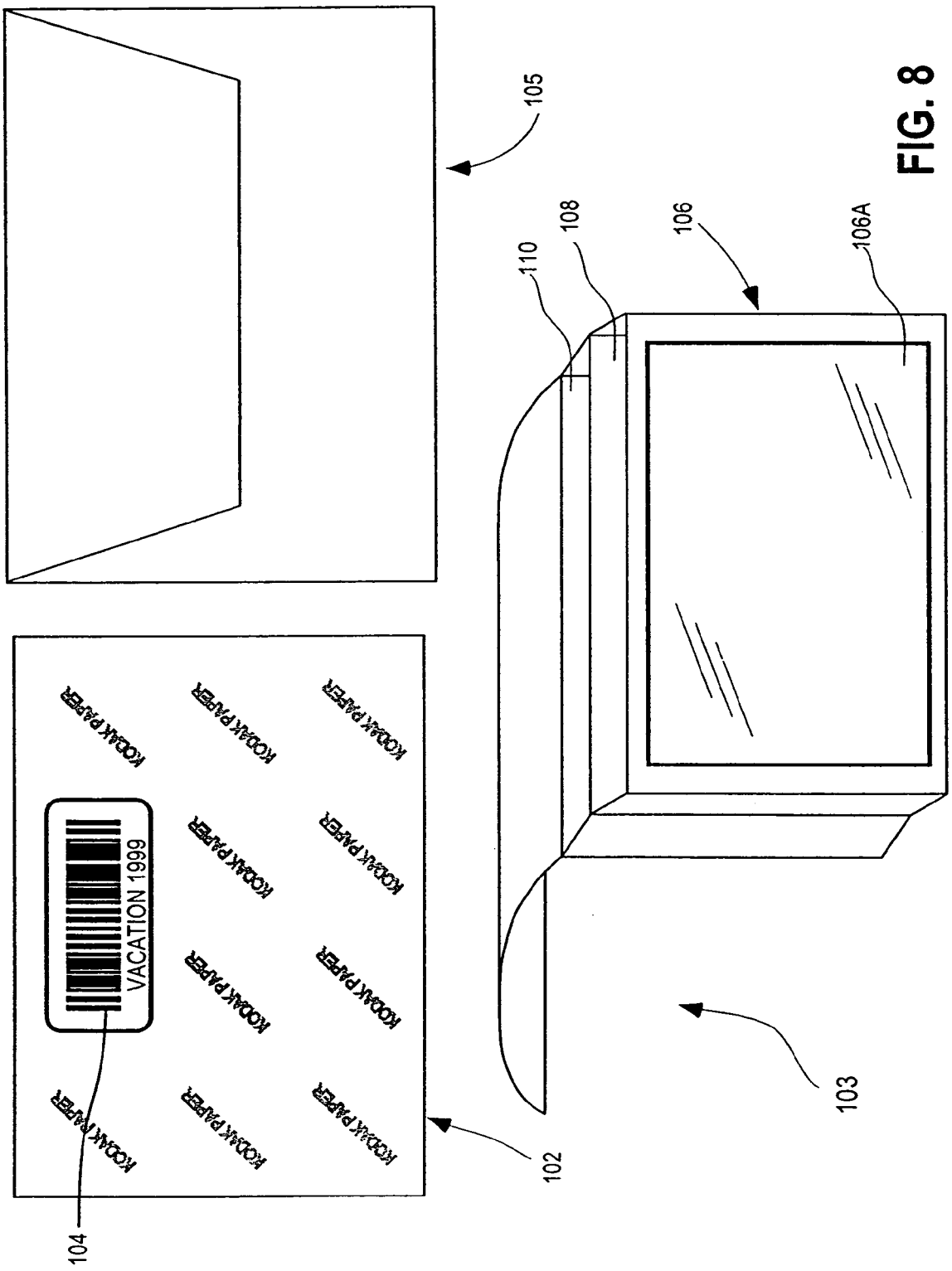
FIG. 8 illustrates a modified kit made in accordance with the present invention.

Referring to FIG. 8 there is illustrated another modified kit 103 made in accordance with the present invention. In this particular embodiment, individual envelopes 105 are provided. The envelopes 105 are designed to hold photographic prints 102. In the particular embodiment illustrated, the print 102 has a label 104 which is machine readable and can be read during scanning of the print to assist in grouping of the digitally captured images. In the present invention illustrated, label 104 is a preprinted label that has been entitled "Vacation 1999." A plurality of different envelopes 105 can be used to further segregate the photographs into individual categories. An instruction form 74 (not shown) having a machine readable code 76 can be placed with images in the envelope 105 for providing of the information to be associated with the enclosed images. The envelopes 105 are then placed into container 106 and the particular embodiment has a pair of pockets 108, 110 each designed to receive at least one envelope 105. Pocket 108 would contain envelope 105 with pictures (hard copy prints) intended for scanning and pocket 110 would contain envelope 105 with materials not intended for scanning. An example of print materials not intended to be scanned could be prints that were part of an original processed which are not desired to be scanned. This permits the easy reassociation of the images after the scanning process. The container 106 has a clear window 106A that allows placement of instruction form 74 in front of envelope 105 thus allowing the operator to view the instructions before removing the envelope containing prints.

Figure 9:
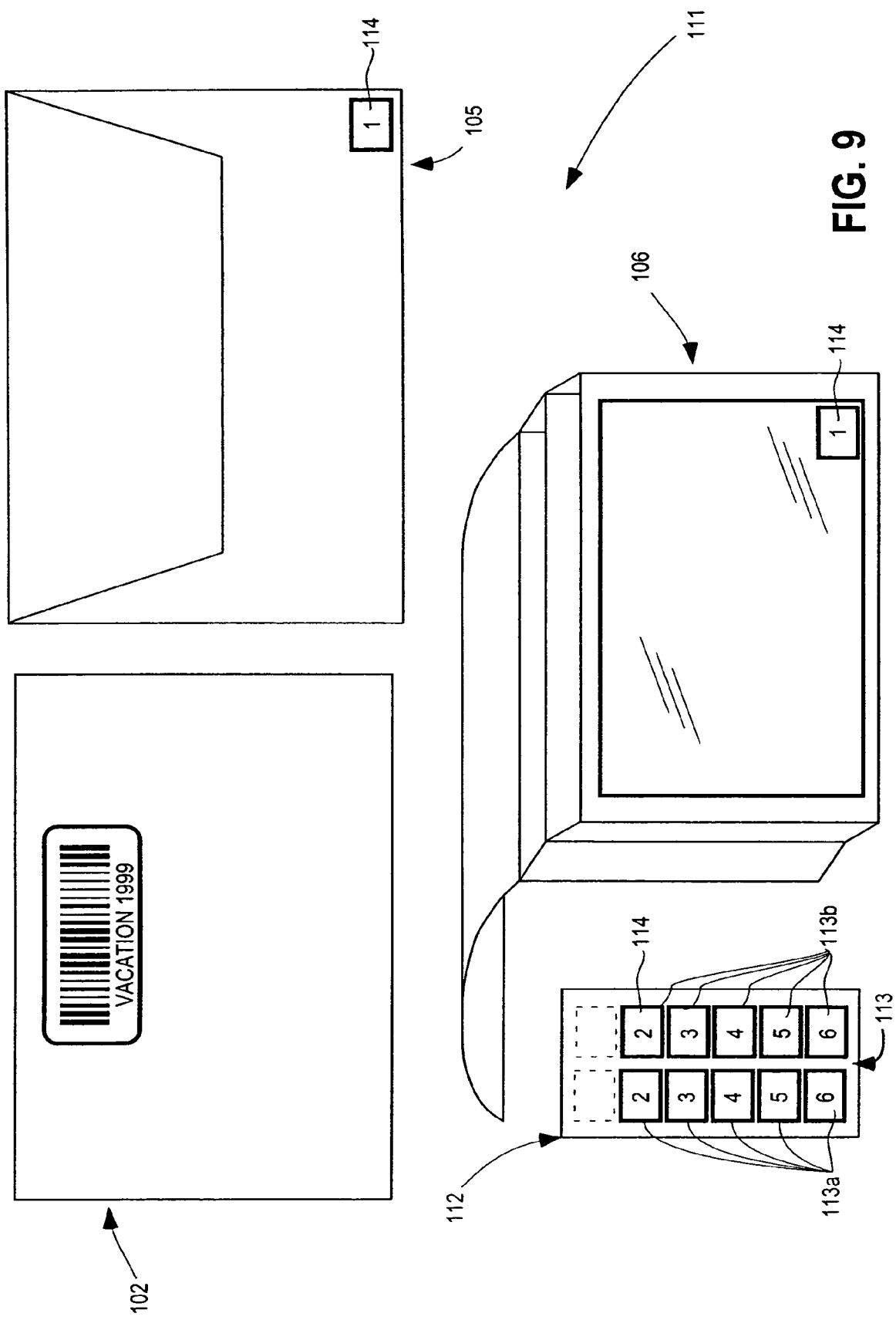
FIG. 9 illustrates another kit made in accordance with the present invention.

Referring to FIG. 9, there is illustrated another modified kit 111 made in accordance with the present invention. The kit 111 in FIG. 9 is similar to kit 103 of FIG. 8, like numerals indicating like parts and operation. In this embodiment, there is provided an identification sheet 112 having a plurality of removable sticker labels 113a and 113b having identification peel off numbers 114. In particular, stickers 113 are provided in pairs, for example, there are three pairs of peelable stickers identified as 1, 2, 3, 4, 5 and 6. The identifying peel-off labels 114 are such that one may be placed on container 106 and one on envelope 105 so that they can be coordinated and identified.

Figure 10:
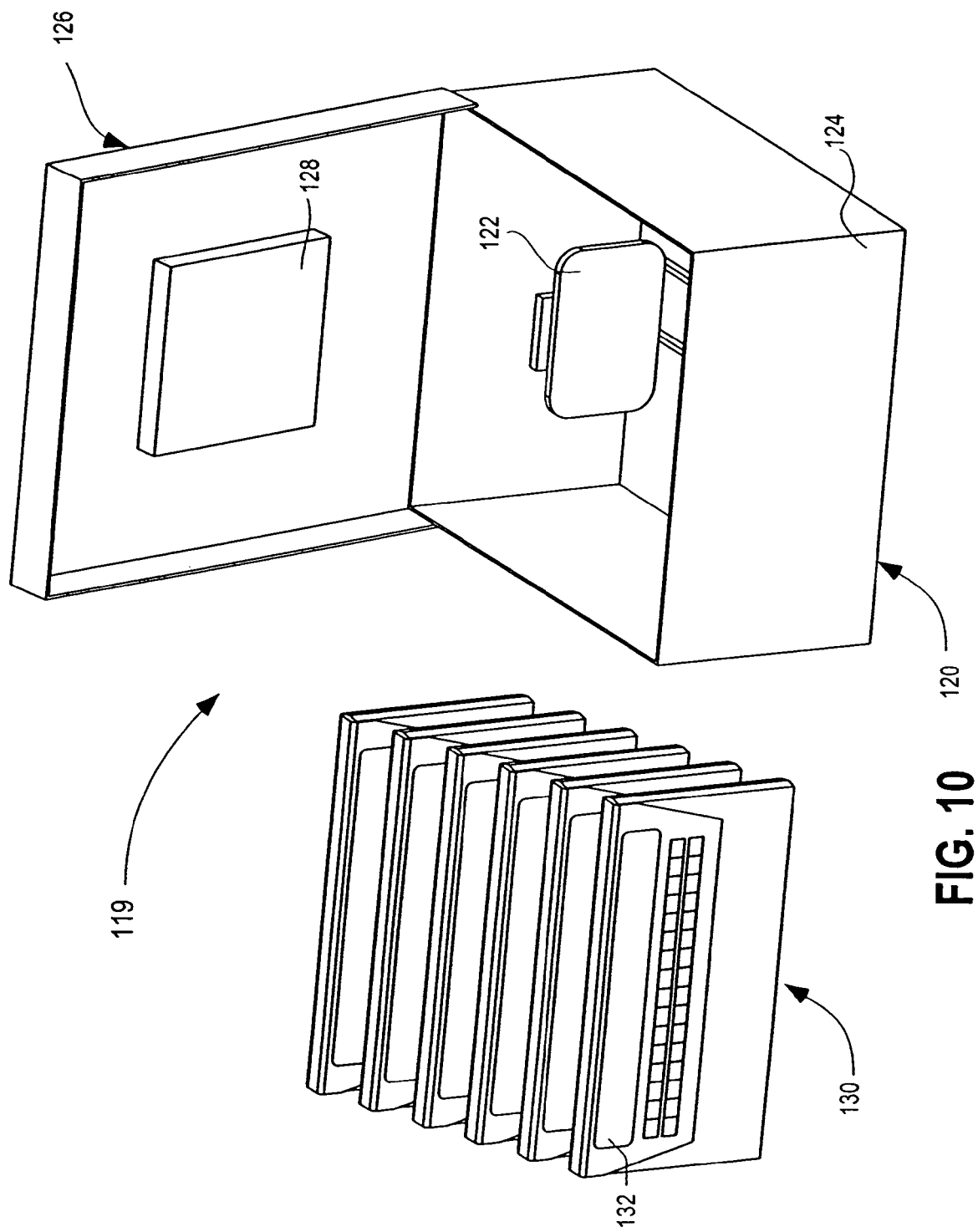
FIG. 10 illustrates another modified kit made in accordance with the present invention.

Referring to FIG. 10 there is illustrated yet another modified kit 119 for organizing hard copy prints in accordance with the present invention. In this particular embodiment, there is provided a container 120 having a slidable back support member 122 therein such that the back support member 122 may be moved with respect to the front panel 124 so as to vary the size of the area for receiving hard copy prints. The support member 122 assists in maintaining the prints and/or envelopes placed therein in a vertical upright position. The container 120 includes a lid 126 having a second compartment 128 for the receiving images provided in a different format. For example, digital images provided in a CD, computer disk etc. In the particular embodiment illustrated, the compartment 128 is designed for receiving compact disk having digital images stored thereon. Appropriate ID card may be provided for identifying the images on the disk so that images contained thereon can later be associated with the images provided in the other formats provided in the kit. This ID be placed on a label on the disk or in electronic form on the disk which can be read at the time of obtaining of the digital images. This ID can also be used in identifying the grouping of the images with other images. The kit further includes a plurality of envelopes 130 each designed to receive a grouping of images. Appropriate labels or icons 132 may be used for identifying categories for each of the envelopes. For example, one envelope can be for birthdays, another can be for individuals, like father, son, family. Others can be grouped in any-desired manner desired by the consumer. Likewise the appropriate labels can be designated as desired by the consumer. Also, these categories may be written in machine readable form, such as a barcode, on the envelope or a label produced by any appropriate printing device such that the categories can be read from scanning of the label and/or envelope.

Figure 11:
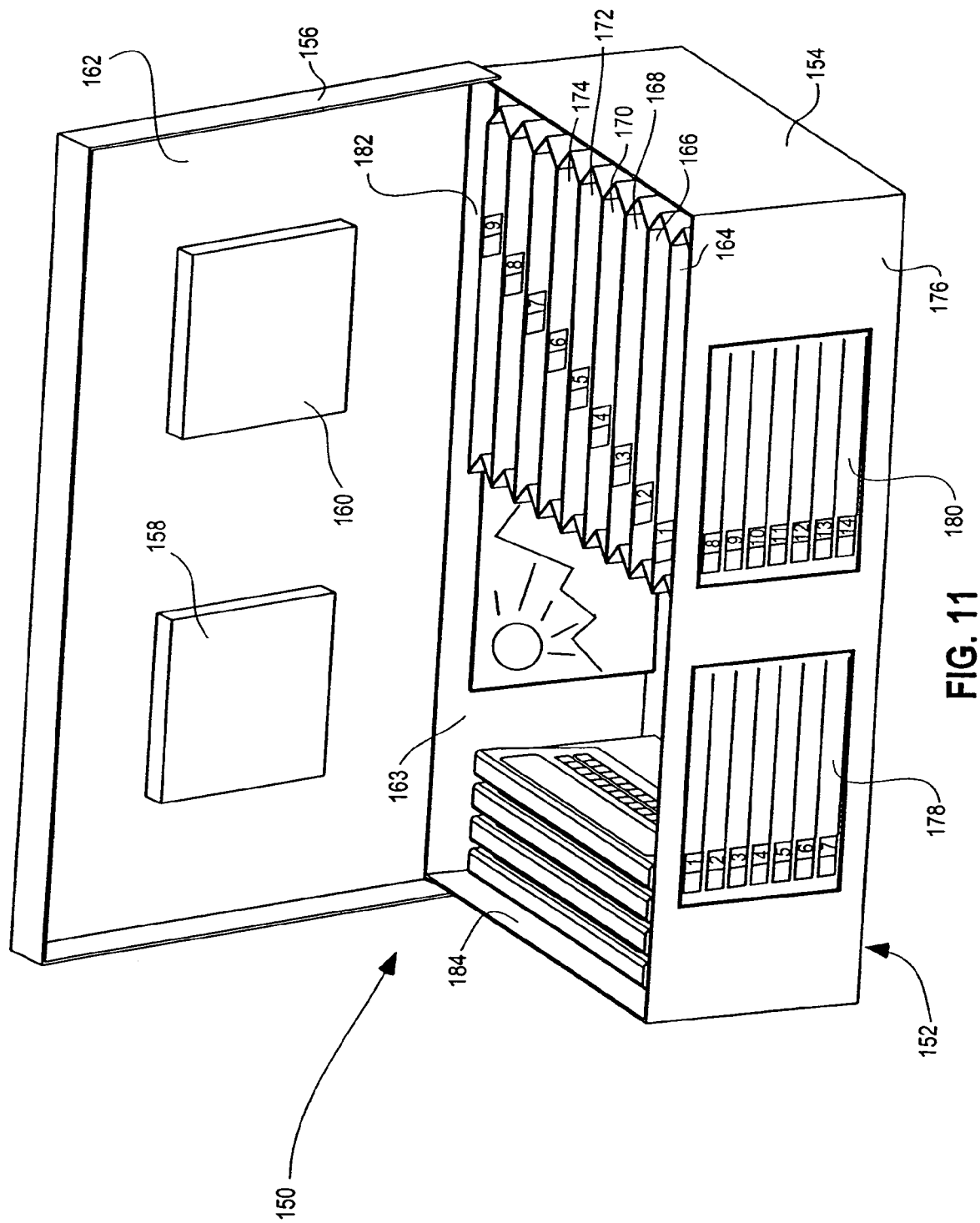
FIG. 11 illustrates yet another modified kit made in accordance with the present invention.

Referring to FIG. 11 there is illustrated yet another kit 150 made in accordance with the present invention. In the particular embodiment illustrated, the kit 150 comprises a container 152 which includes a base portion 154 and a lid 156 such that when the lid 156 is secured to base 154 a closed container 152 is provided. The container 152 of FIG. 11 is illustrated with the lid 156 in the open position. In the particular embodiment illustrated, a pair of compartments 158, 160 are provided on the top surface 162 of lid 156 for retaining various items (See FIG. 12). In the particular embodiment illustrated, the compartment 160 is designed for receiving order form and/or instruction forms whereas the compartment 158 is designed to receive items having images stored thereon. For example, but not limited to a compact disk, computer disk, flash card, electronic camera, film negatives, film cassettes (such as 35 mm or APS), etc. Thus in this embodiment the images to be grouped may be obtained from a variety of different sources. In addition to the physical sources of images, as previously noted, the images may be obtained from a variety of other sources, for example various electronic sources. Images to be grouped may be obtained from computers, electronic databases, friends, relatives and other third party sources that can be accessed electronically over a communication network such as the internet. In this case a URL (universal resource locator) will be provided where the desired image can be automatically accessed and retrieved by the service provider.

The base 154 forms a retaining section 163 which in the particular embodiment is provided with a plurality of compartments 164, 166, 168, 170, 172 and 174. In the particular embodiment illustrated there is illustrated seven compartments. However, it is to be understood that any desired number and size compartments may be provided. On the outside of the front panel 176 there is provided a pair of identifying labels 178, 180 which are used for identifying what is contained within the container 152. The section 163 further includes an area 182 for receiving of individual prints may or may not fit within the designated compartments 164-174 such as album pages, other documents that are desired to be scanned and/or incorporated in the goods and services to be provided. Also, there is provided an area 184 for receiving other items.

The labels 178, 180 may be used in identifying the categories in which the photographic prints have been placed and/or for the providing of information to be associated with the images. In the particular embodiment illustrated, there may also be provided instruction cards for each of the separate compartments identifying what is to be done with the associated images. However, it is to be understood that other information and instructions may be provided as desired.

Figure 12:
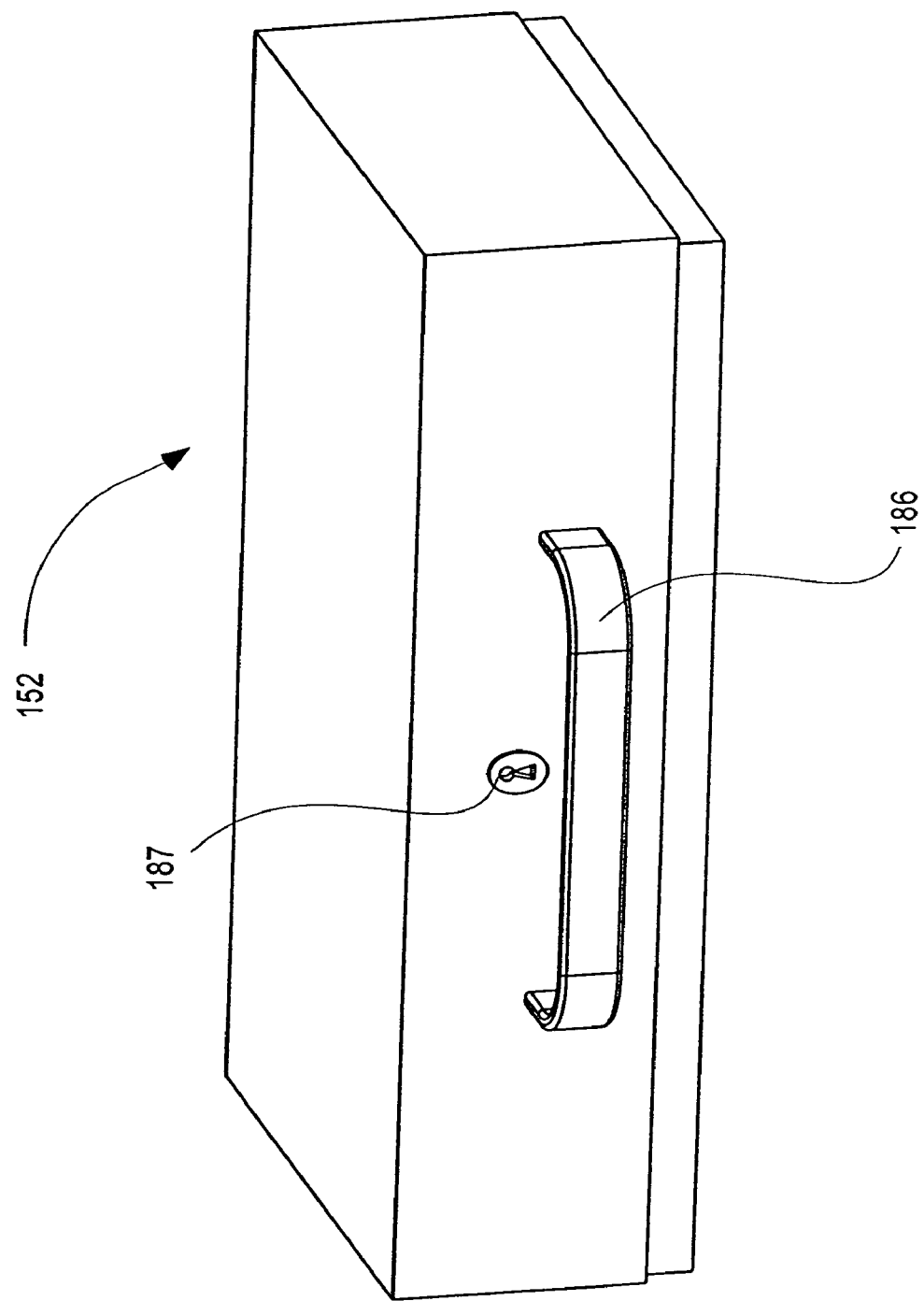
FIG. 12 illustrates the container of the kit of FIG. 11 in the closed position.

Referring to FIG. 12, there is illustrated the container 152 of FIG. 11 shown in the closed position. As can be seen for ease of carrying of container 152 there is provided with a handle 186. In addition for security reasons, there is provided a locking mechanism 187 for locking of the container such that unauthorized individuals will not have access thereto and also for securely maintaining of the images therein.

Figure 13:
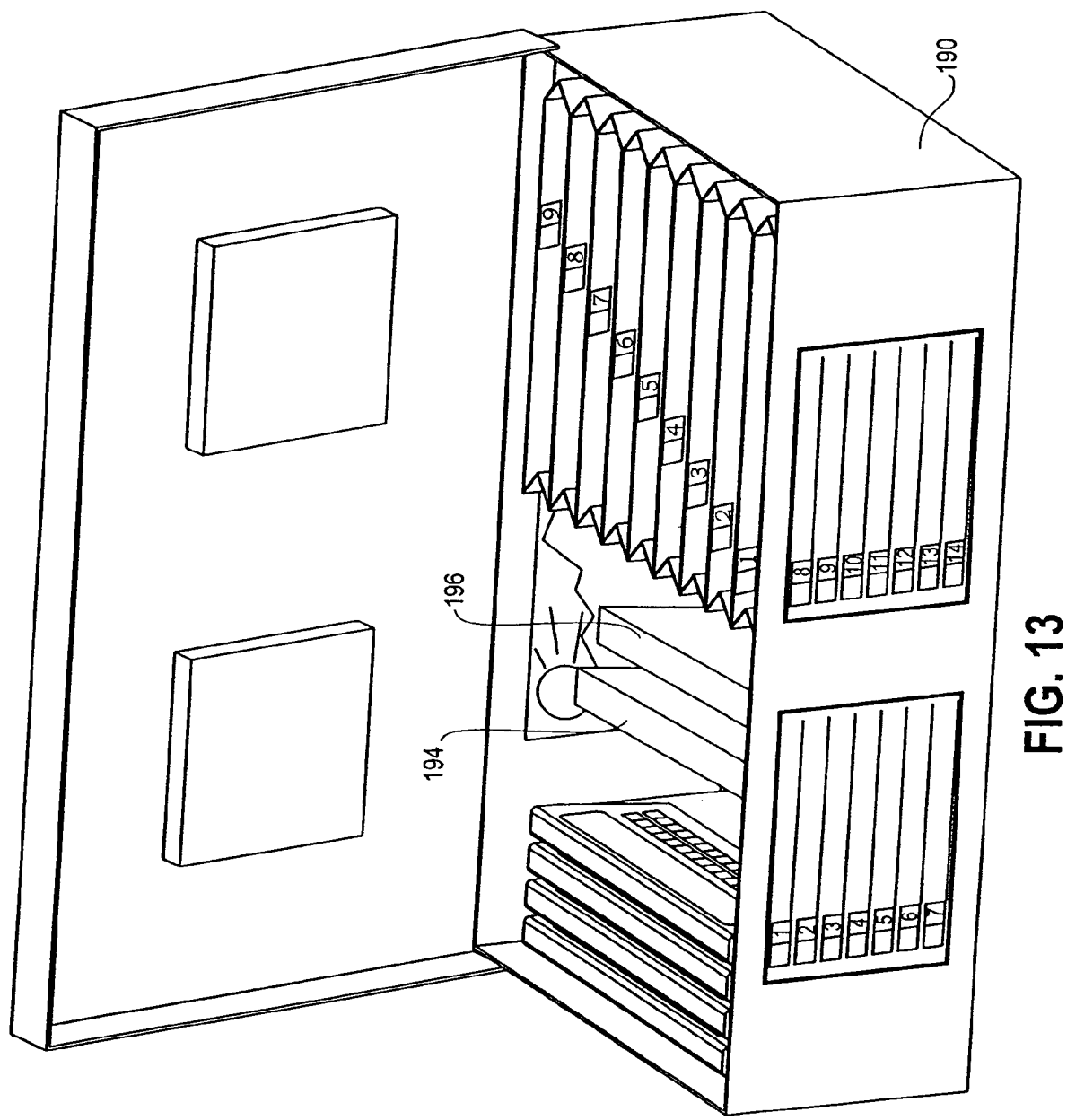
FIG. 13 illustrates still another kit made in accordance with the present invention.

Referring to FIG. 13, there is illustrated a kit similar to that illustrated in FIG. 11 like numerals indicating like parts and operation. However, in this embodiment the container 190 is not provided with a cover. This type construction may be suitable for situations where customer hands the container 190 directly to a sales representative for processing. In the particular embodiment illustrated there is provided a pair of containers 194, 196 for containing index cards and labels respectfully. In particular, the index cards and labels would be used for identifying and categorizing the images as previously discussed. Preferably the information noted thereon would include human readable and machine readable instructions to accommodate whether this automatic reading and/or manual review will be conducted.

Figure 14:
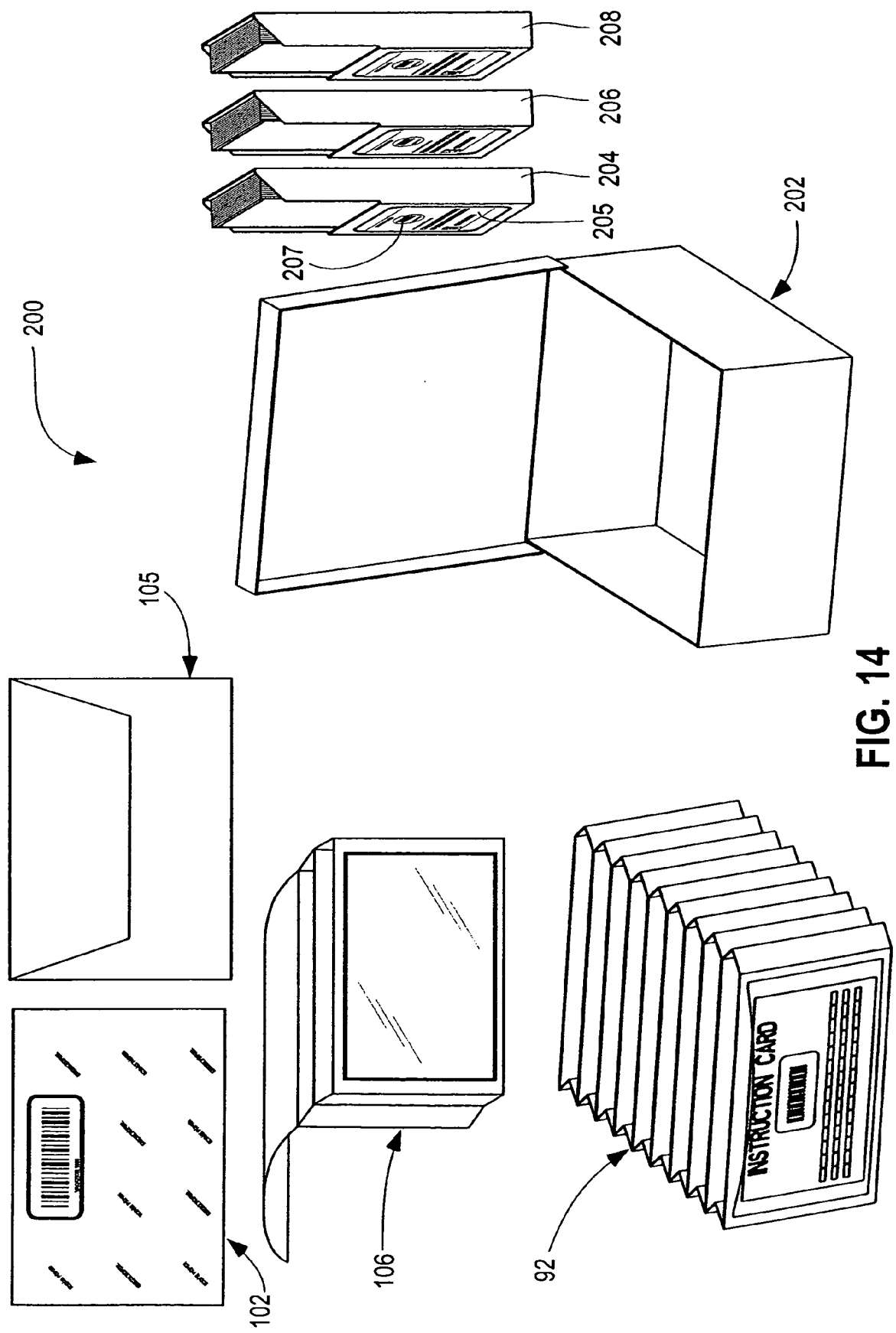
FIG. 14 illustrates a modified kit similar to the kit of FIG. 13 also made in accordance with the present invention.

Referring to FIG. 14 there is illustrated yet another kit 200 made in accordance with the present invention, like numerals indicating like parts as previously discussed. In this embodiment, there is provided a container 202 for photographic prints 102 envelopes 105, containers 106 and folders 92 as previously discussed. In addition, a plurality of containers 204, 206, 208 may be provided for holding of hard copy documents to be scanned. The containers 204, 206, and 208 are adapted to mate with the automatic feeder of a scanner whereby the hard copy documents can be automatically fed directly from the container into the scanner. Labels 205 are provided on each of the containers 204, 206, and 208 for identifying the group of documents and/or providing of instruction with respect to the documents contained therein. Preferably the labels 205 have a machine readable code 207 thereon which can be read by an appropriate reader provided on the scanner. This information read can then be associated with the image being scanned.

Figure 15:
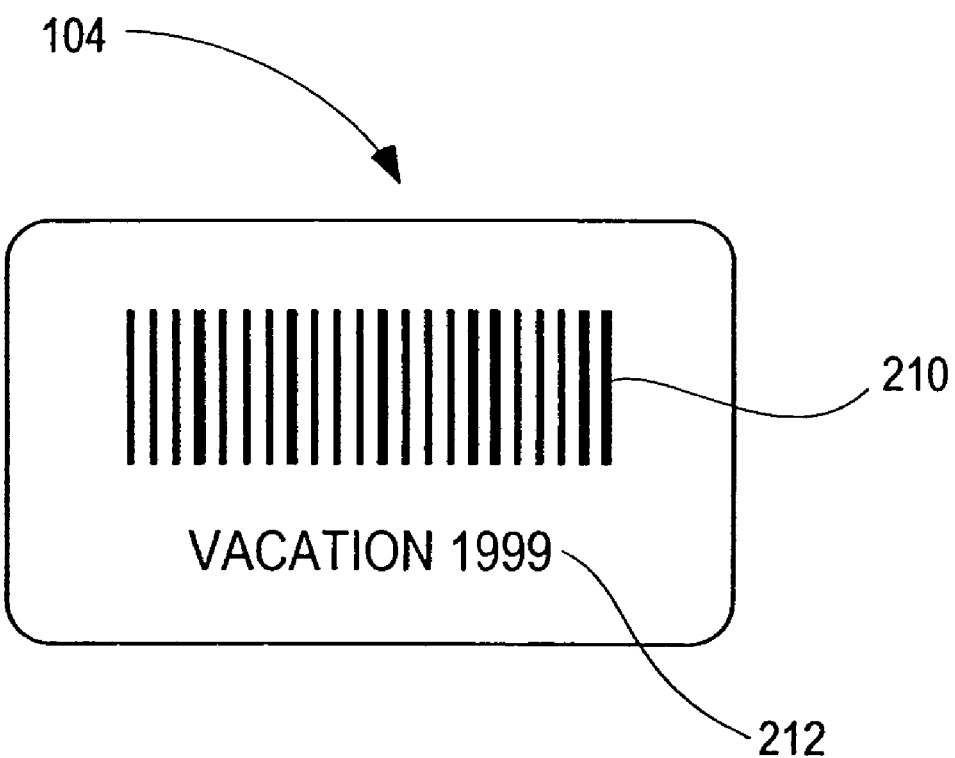
FIG. 15 illustrates a label that maybe used in the practice of the present invention.
Figure 16:
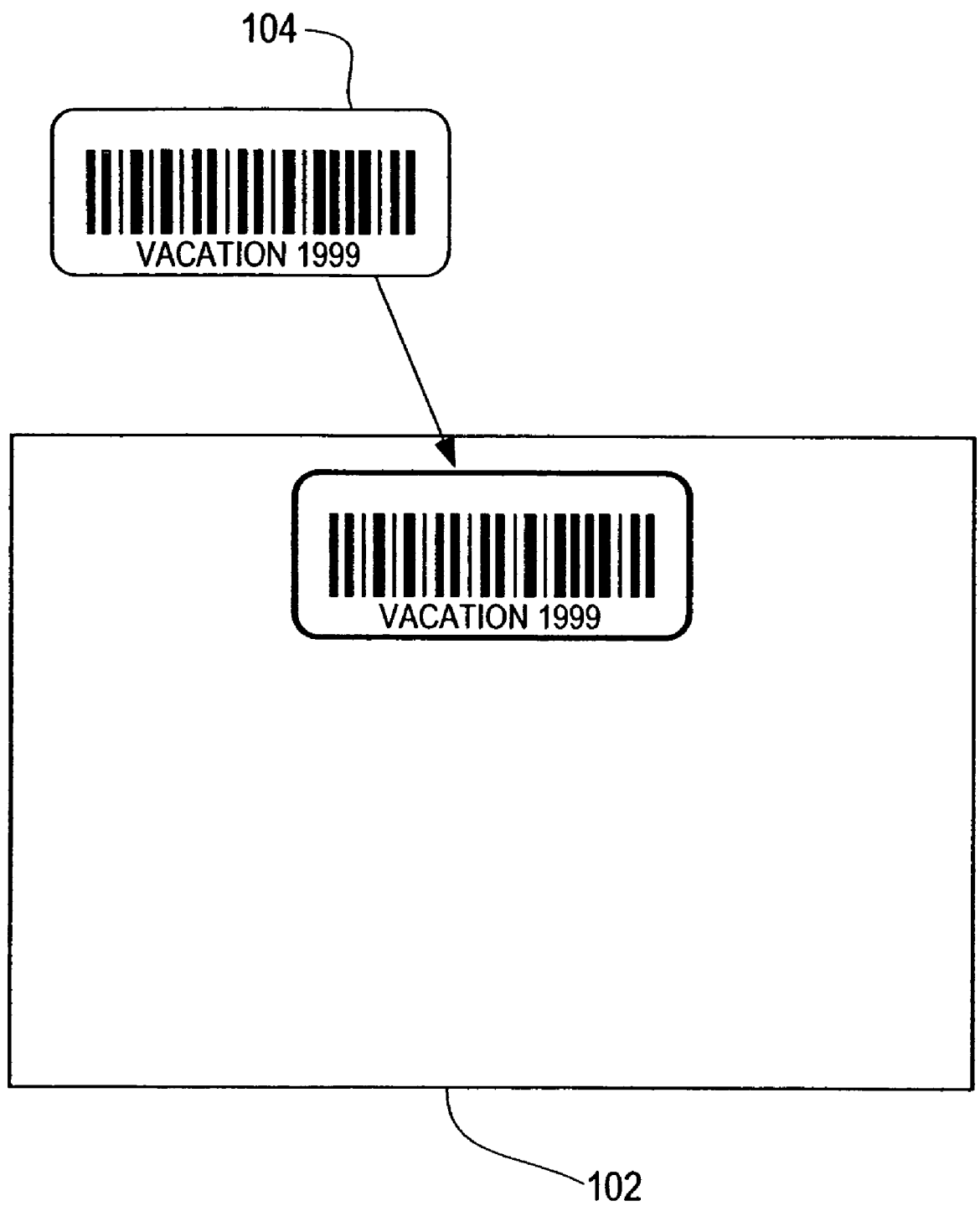
FIG. 16 illustrates the label of FIG. 15 placed on a print.

Referring to FIG. 15 there is illustrated a label 104 that can be placed on the prints, envelopes or other items that are used to hold and categorize the hard copy documents. In the particular embodiment illustrated the label includes a machine readable code 210 and a human readable counterpart 212 which indicates what is provided in the machine readable code 210. It is of course understood that any particular instruction or code may be provided as previously discussed. The label 104 may be ordered as desired from the supplier or provided as part of a list of categories and options to be used. The label 104 can then be placed on hard copy print as illustrated by FIG. 16.

While applicants have disclosed the use of labels for providing of information that can be read by the scanner, the present invention is not so limited. The information may be provided on the container, envelopes, order forms, etc. by any printing technique, for example, but not by way of limitation, the printing directly thereon, or by the use of a stamp or preprinted label Referring to FIGS. 17*a*-17*b*, there is illustrated a modified container 220 for holding a plurality of hard copy prints 222. The container 220 is designed to be used directly with a scanner capable of securing the documents placed therein.

Figure 17A:
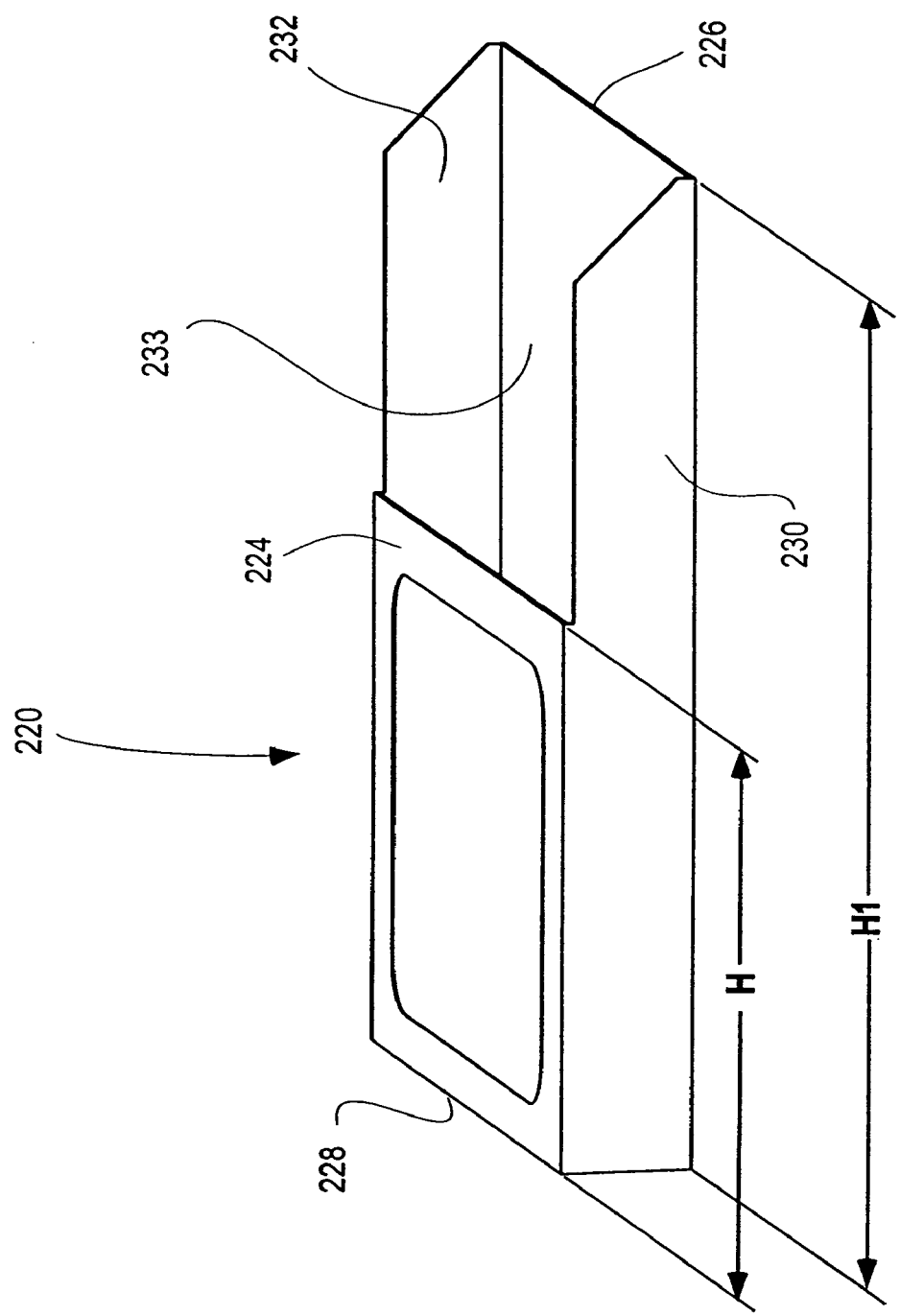
Figure 17B:
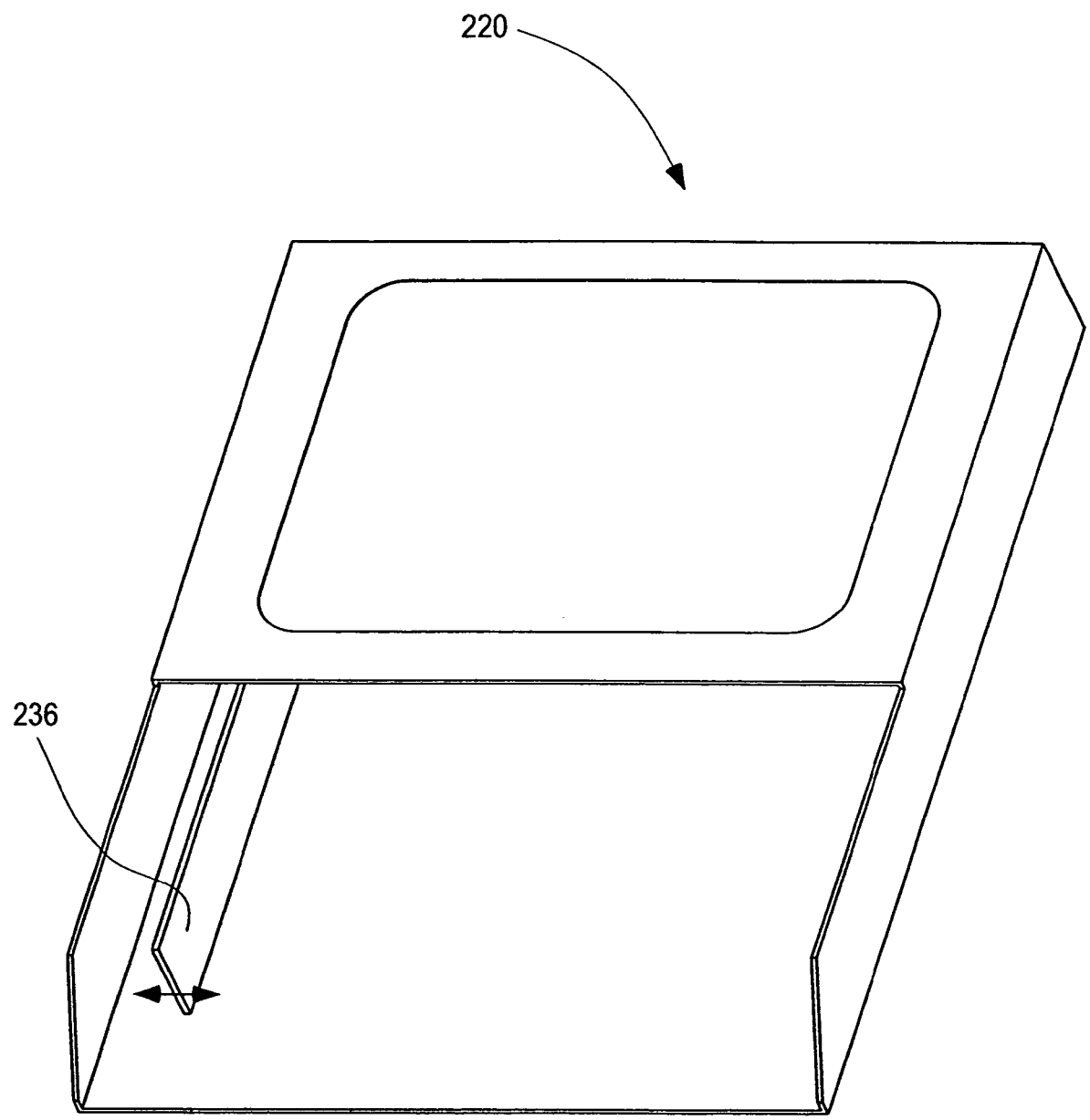

The container 220 includes a front panel 224, a back panel 226, a bottom panel 228 and a pair of side panels 230 and 232. The front panel has a height H which is less height H1 of the back panel 226, thus providing an opening 233 whereby the prints 222 may be placed and viewed. An instruction and/or information label 234 maybe provided on the front panel 224 as illustrated in FIG. 17c. As illustrated by FIG. 17b, there may be provided a removable guide 236 which can be used to accommodate smaller size documents/prints 222 placed therein. Preferably, the guide 236 bias the prints 222 to one side of the container 220. The container 220 has a shape such that the prints can be delivered directly to a scanner 240 as illustrated in FIG. 17d. Thus, the opening 233 and the size and shape of the container is constructed such that it mates with an opening 242 of the scanner 240 such that the documents may be presented to the scanner in an appropriate manner for automatic removal therefrom for digital scanning of the.

Figure 18:
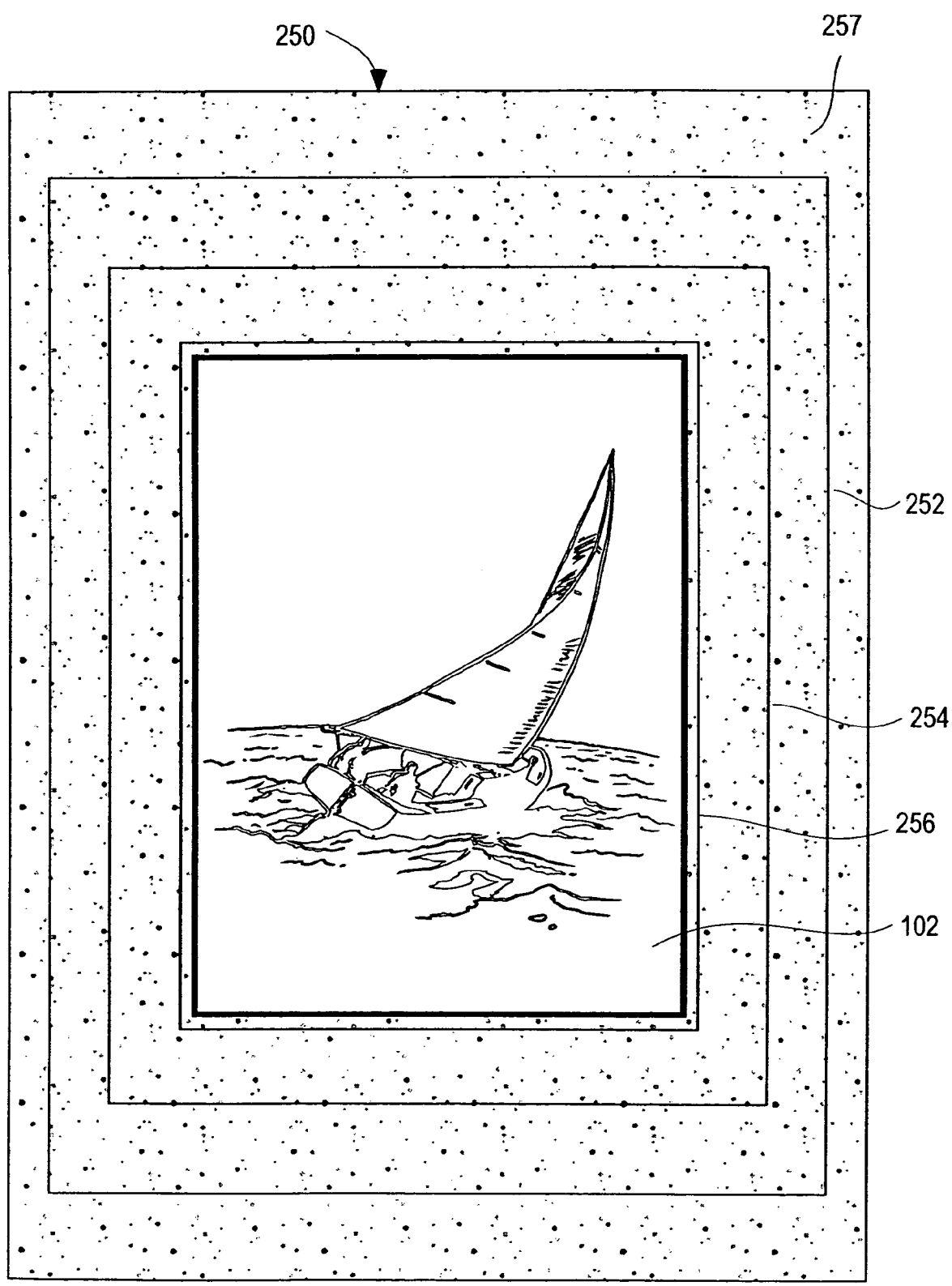
FIG. 18 illustrates a carrier for holding a hard copy document for feeding of the document into an automatic feed scanner.

Referring to FIG. 18, there is illustrated a modified carrier 250 for holding a hard copy print of a size smaller than which the scanner is designed to be used and/or for documents of a fragile or special nature that make it unadvisable to merely stack the hard copy print with a plurality of other prints for automatic scanning. For example if the print is not as minimal size as desired for automatic feeding in the scanner or of a delicate nature where damage may occur during automatic feeding of the print in the scanner the carrier 250 would be used. In particular, as illustrated by FIG. 18, modified carrier 250 includes alignment marks 252, 254 and 256 which are used to assist in the aligning the image in the center of the modified carrier 250. There is provided a light adhesive layer 257 on the surface of sheet 250. This allows the print 102 (a single print or multiple prints) to be temporarily adhered to the top surface so that it can be automatically fed through a scanner, yet allow easily removal of the image from the carrier with out any affect to the image. An example of suitable adhesive is of the type that is used on Post it® notes. Once the print is secured to the carrier, the carrier with secured print can be automatically fed into the scanner.

Figure 19:
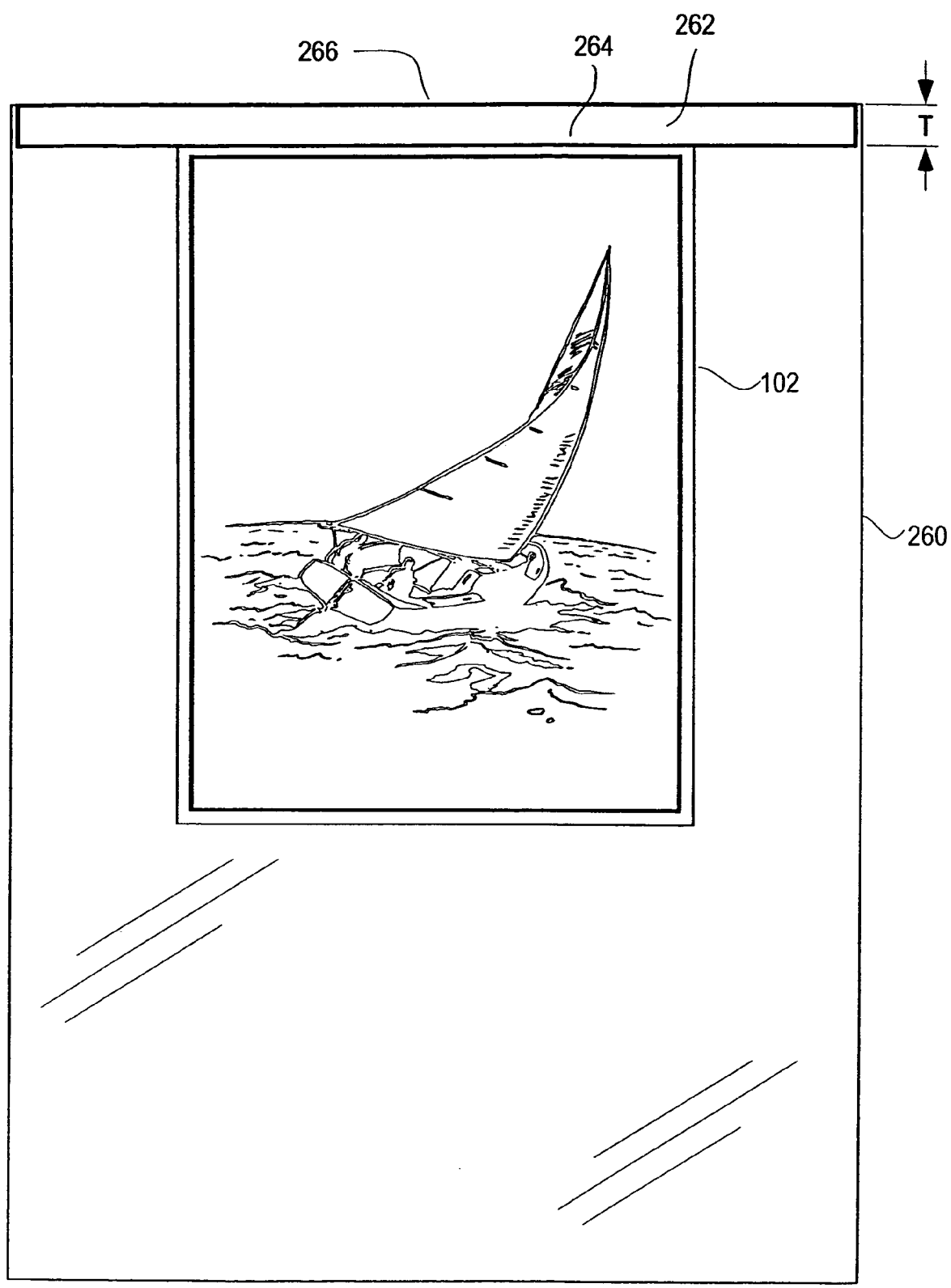
FIG. 19 illustrates a modified carrier for holding a hard copy document for feeding of the document into an automatic feed scanner.

Referring to FIG. 19, there is illustrated another modified carrier 260 for use in automatically feeding of the print into a scanner. In this embodiment, the carrier 260 includes a retaining member 262 at the front leading edge of the sheet. In the particular embodiment illustrated, the retaining member 262 is of a flexible nature such that when the top portion 264 of a print 102 is placed in carrier 261, retaining member 262 it will securely hold the print 102 in relatively stationary position. The retaining member 262 has a relatively small thickness T such that only a small portion of the print is covered thereby minimizing the amount of image lost. This retaining member can be transparent so that the entire print 102 can be scanned without the leading edge being cropped. With regard to prints having borders it can be seen that virtually no image area is lost from the print 102. The retaining member 262 is provided at the leading edge 266 that is fed into an automatic type scanner.

Figure 20:
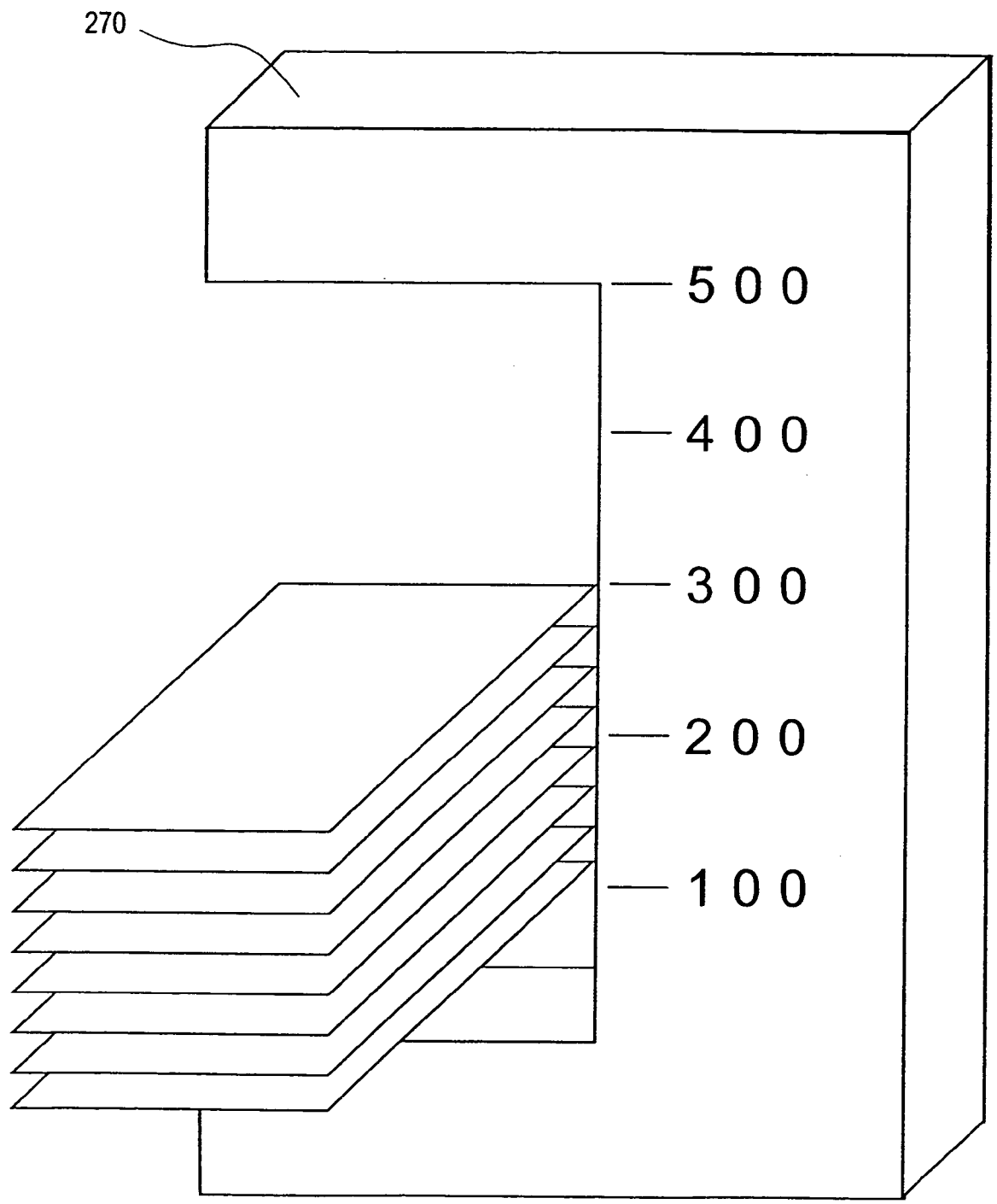
FIG. 20 illustrates a tool for measuring the number of document to be scanned.

Referring to FIG. 20 there is illustrated a sample of a tool 270 that can be used for determining the amount of prints that are to be scanned. The tool 270 is used so that appropriate calculation can be made as to the cost of the service to be provided and also can be used to determine the amount of material that will be used in producing of the product. For example, if a customer orders album pages of particular size and shape and there are a certain number of prints of a particular average size, then the appropriate amount or number of album pages can be calculated.

Referring back to FIG. 2, the customer places the images in the appropriate kit or containers as illustrated in FIGS. 3-13. The customer at step 280 places the hard copy prints in envelopes. At step 282, appropriate customer labels are provided and then put into the containers at step 284. At step 286, the customer fills out appropriate order forms. At step 288 customer hands over or carries the kit to the service provider. This may also be in the form of bringing the completed kit to a kiosk for use therewith. Thereafter, once the images have been delivered, the appropriate products will be provided by the service provider and then returned as appropriate.

Order Placement

Figure 21:
FIG. 21 illustrates yet another customer order form made in accordance with the present invention.

Referring to FIG. 21 there is illustrated a customer order form 300 that may be used in the ordering of goods and/or services in the system according to the present invention. The order form 300 illustrated is shown as a hard copy form which can be filled in by a customer. This form can equally be provided on a computer screen and associated with a computer for forwarding of the customer order electronically to the retailer or image service provider as discussed later herein. In the particular embodiment illustrated, the customer order form 300 has a variety of different goods and/or services that may be provided with regard to the goods that could be provided, the item listed as number 1 could include hard copy output for producing of the prints in album pages. Various selections are provided for the ordering of the products. It is of course understood that any other type of product including prints and reprints may be ordered and the present invention is not limited to the hard copy output and products illustrated, for example, labels, image transfers for use with mugs, T-shirts. Thus, the customer order form 300 may provide as set forth a variety of output products or services and associated selection boxes 292. Appropriate machine readable codes 322 are preferably provided so that automatic entry of the customer may be accomplished. There is of course a place in form 320 for a customer's name, address, phone number, e-mail address and method of payment. Lastly, the last category provided on the form 300 is where the goods and/or services are to be sent 328 to which may be to the customer or third party or whomever the customer so desires. This also includes sending the output to a particular e-mail address or a particular account or storage or business. It is of course understood that the customer order form may take a variety of forms and be able to provide any desired goods and/or services that are available. Order form 300 also includes an order ID 324 which has an associate machine readable code 326.

System

Figure 22:
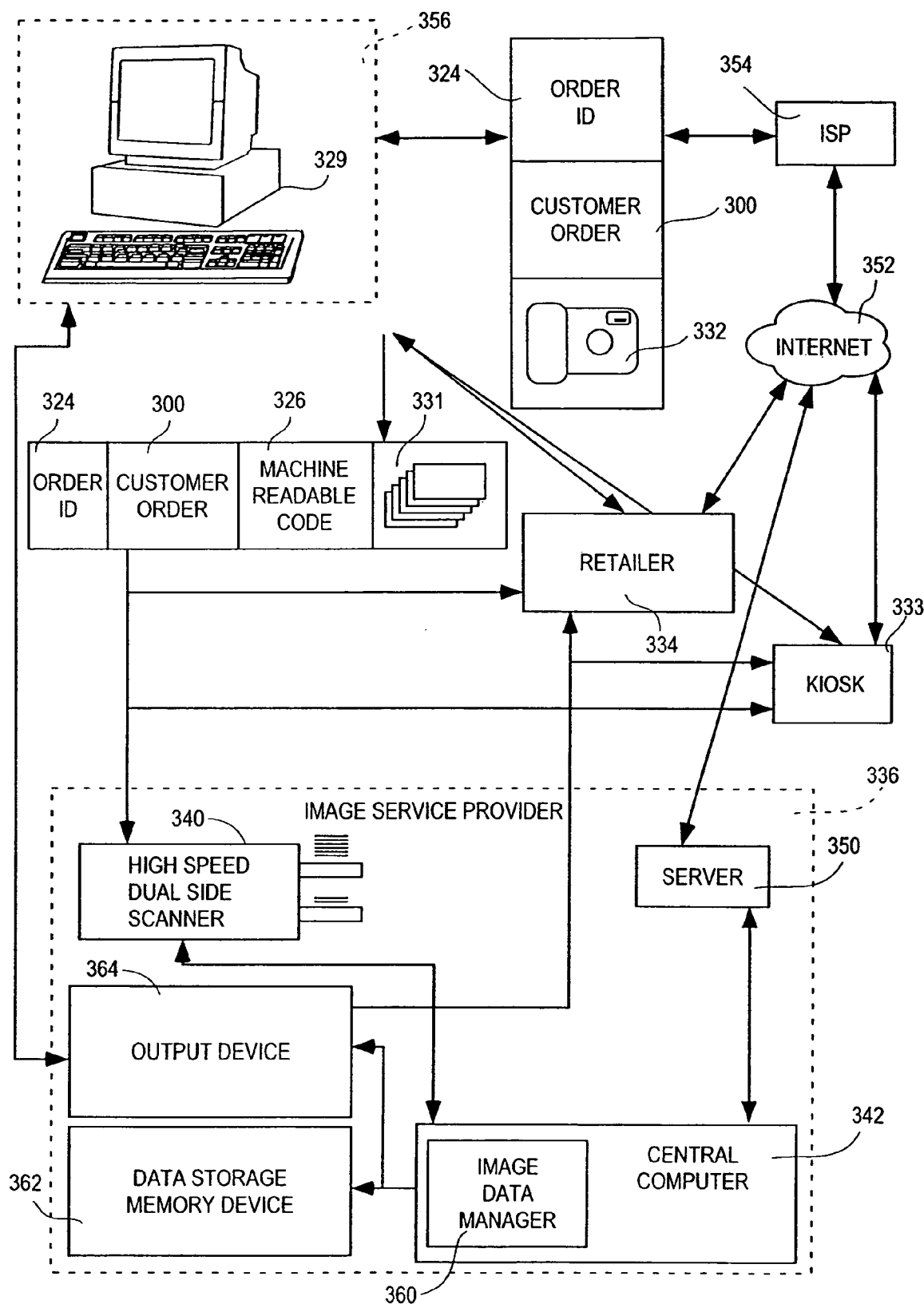
FIG. 22 illustrates a block diagram of a system for ordering of goods and services in accordance with the present invention.

Referring to FIG. 22 there is illustrated a system 330 for practicing the present invention. In particular, the system 330 includes first a source of images. As previously discussed, this may be hard copy documents 331 or may be a digital source 332 such as a digital camera, digital scanner, etc. No matter what the source of the images, the images are provided to a retailer 334 or an image service provider 336, which may be the same entity. A kiosk 333 or other type device (or system) may be provided at the retailer 334 for use by the retailer 334 or customer in organizing the images, reviewing the images and/or ordering of goods or services relating to the image as discussed herein. The primary function of the retailer 334 is to accept the order from customers whereas the image service provider 336 is capable of providing the actual goods and/or services to the customer. The goods and/or services may be returned directly from the image service provider 336 to the customer or to the retailer 334 and then to the customer. In the particular embodiment illustrated, the image service provider 336 provides various ways for capturing and/or obtaining of the digital images. As illustrated, the image service provider 336 is provided with a scanner 340 and central computer 342. The scanner 340 in the particular embodiment illustrated, is designed for scanning of the hard copy documents, such as photographic prints, and turning the scanned images into digital record file that can be digitally manipulated and used for providing of image goods and/or services. It is to be understood that inputs can be in the form of photographic negatives, slides, CDs and other digital materials from an online account. The central computer 342 may be used for obtaining of the digital record file for each of the images. This may be done for example over a communication network, such as the internet, whereby the service provider obtains digital images from various sources as previously described. Appropriate customer data information is entered into the system for association with the digital images scanned for each customer order. This can be accomplished by a variety of different methods. In a situation where hard copy documents are being provided for scanning, information may be provided on a customer order, such order form 300 which includes an order ID 324 and associated machine readable code 326. Thus, if the customer order form is scanned the appropriate code can for instance identify that it is a customer order form and provide certain encoded information. Further, the form can be set up such that by appropriately checking certain selection boxes, the information being requested can be immediately associated therewith. In addition, the customer order form may be similarly encoded with respect to the kit and various numbers provided on the labels used for grouping of the images. This way as the images are scanned, these codes can also be associated with the customer order and automatically associated with the appropriate images by the central computer 342. Likewise, if the digital images are sent directly to the retailer and/or computer 342, a similar type customer order number may be provided and associated with the images and the customer order. The scanner 340 is also capable of reading and interpreting instruction forms and icons as previously discussed, such that the special instructions provided by the instruction forms or can be immediately interpreted and effectuated by the computer. The central computer 342 can also be is used for coordinating of the images and may be associated with a server 350. The server 350 may be hooked up to the Internet 352 which may be hooked up an Internet service provider 354 which in turn could be connected to a customer 356.

System 330 includes an image data manager 360 that can manipulate the images as preprogrammed or by instructions that have been machine read by scanner 340 and forwarded on to computer 342. The manipulation may include, but not limited to, grouping, sorting, improving image characteristic such as color tone, red eye, scratch removal, determining the best place (white space) to place text to be added, etc. and providing meta-data as appropriate with regard to the associated images. Color correction and sharpening can be done automatically or at the request of the customer. Preferably color correction and sharpening is done automatically in accordance with prestored programs. However, if desired, this can be done manually at some greater cost to the customer. In addition to color correction various other programs may be used, for example, but not by way of limitation, programs may be used to give a similar look to all of the images in a group and/or order, provide the images in the same size or selected pattern of sizes, provide the image in the same resolution. An example would be to provide a soft or matte finish to all of the images. Since image will most likely be obtained from a variety of sources over and extended period of time, it may be desirable to provide a common look to the grouped images.

Also the image data manager 360 may to do some automatic grouping and/or sorting of images by texture, scene, faces, or content information obtained during scanning of the images. In certain situations, the customer may simply provide a group of image and provide some criteria upon which they are to be grouped. For example, an image of a particular individual, place or thing may be selected by the customer. Appropriate computer programs can then be used to group the images in accordance with the selected criteria. Face recognition computer programs currently exist which can identify an individual from a plurality of images.

As shown in FIG. 22, a digital camera 332 may be used to capture an image of a person (or other item) against a very specific colored background known as a "blue screen" shot. Algorithms, well known in the art, which are incorporated into image data manager 360 allow the separation of the background and the person (or other item). The separated image can then be used to search for similar content and subsequently, automatic grouping. Another use of digital camera 332 is to take a picture of the original print envelope where it contains some handwritten notes on the outside of the envelope where typically there is provided an area for such handwritten notes. In this case, the image data manger 360 provides the picture of the envelope to facilitate the remembrance of specific events or significance while manually categorizing. Another example of automatic sorting and grouping can be based on other characteristics of the original hard copy prints. Over the years, many photofinishing printing characteristics have changed, but typically for a time period or for a particular photofinishing lab certain features may have maintained constant, certainly for a single roll of developed film. Examples of such characteristics, but not by way of limitation, are: a particular size or shape (for example square); a white border around the image; serrated edges on the print; and a print date provide on the front or back side of the print. Any one or combination of these characteristics could be used for automatic grouping and/or sorting of the images. This same program could be used by the user after receipt of the digital image date files for later automatic sorting and grouping of images. Additional software programs may be provided for any desired purpose. Other examples would be to correct of skew of the images resulting from scanning of the hard copy document through the scanner, automatic formatting of images in an auto albuming program.

The image data manager 360 can incorporate information found on spaces provided on the consumer's envelopes, labels, etc, used to group the images. Such as information may include the Who, What Where, When and Why of images or groups of images into meta-data which can be stored with the images as meta-data or on a database. Also the image data manager 360 can incorporate the group, label information provided by the customer or obtained from a another source as a part of the computer file name such as the name "AndyBirthday" could have the images named such as "AndyBirthday1", "AndyBirthday2", "AndyBirthday3" etc so that if the images are moved through out the computer or internet a person viewing the images would know the main subject of the image. As images are processed through the image data manager 360, images may be presented to the consumer in a final form that represents the final additional product that can be ordered via a click of a mouse. This would encourage the purchase of additional products. Meta-data can be displayed with images such as Who, What Where, When and Why to aid the consumer in remembering the significance of the images. In the case the consumer has given the retailer album pages to scan, the image data manager 360 can extract individual images from the album pages and saved as individual files that can be utilized. In the case that images have been acquired from various consumers and meant to be stored in one depository the image data manager 360 can not only make one depository, but also group the images by the original source or owner. The image data manager 360 can incorporate other effects specified by the consumer during the ordering process, such as, but not limited to music for slide shows or specified transitions or a particular background for an album page or a favorite border or annotation for reprints.

Once the image data manager 360 has completed the image manipulation job, the image output is sent to a data storage memory device 362 and/or if a product is to be produced directly therefrom, it is sent to an appropriate output device, such as device 364. It is to be understood that the output device may compromise a variety of different type devices. For example, but not limited to a image storage and retrieval device, a device for printing images onto a media, including but not limited to photosensitive media, for producing of the hard copy prints requested. Alternatively, the output device 364 which may comprise a device for making a computer disk, a compact disk or other digital storage device wherein the images are arranged, sorted and stored as requested by the customer, devices for producing of transfers which can be used providing of images on the various products such as mugs, T-shirts and other items. The output device 364 may be any appropriate device that is currently available or that may become available in which images can be provided in some form.

Figure 23A:
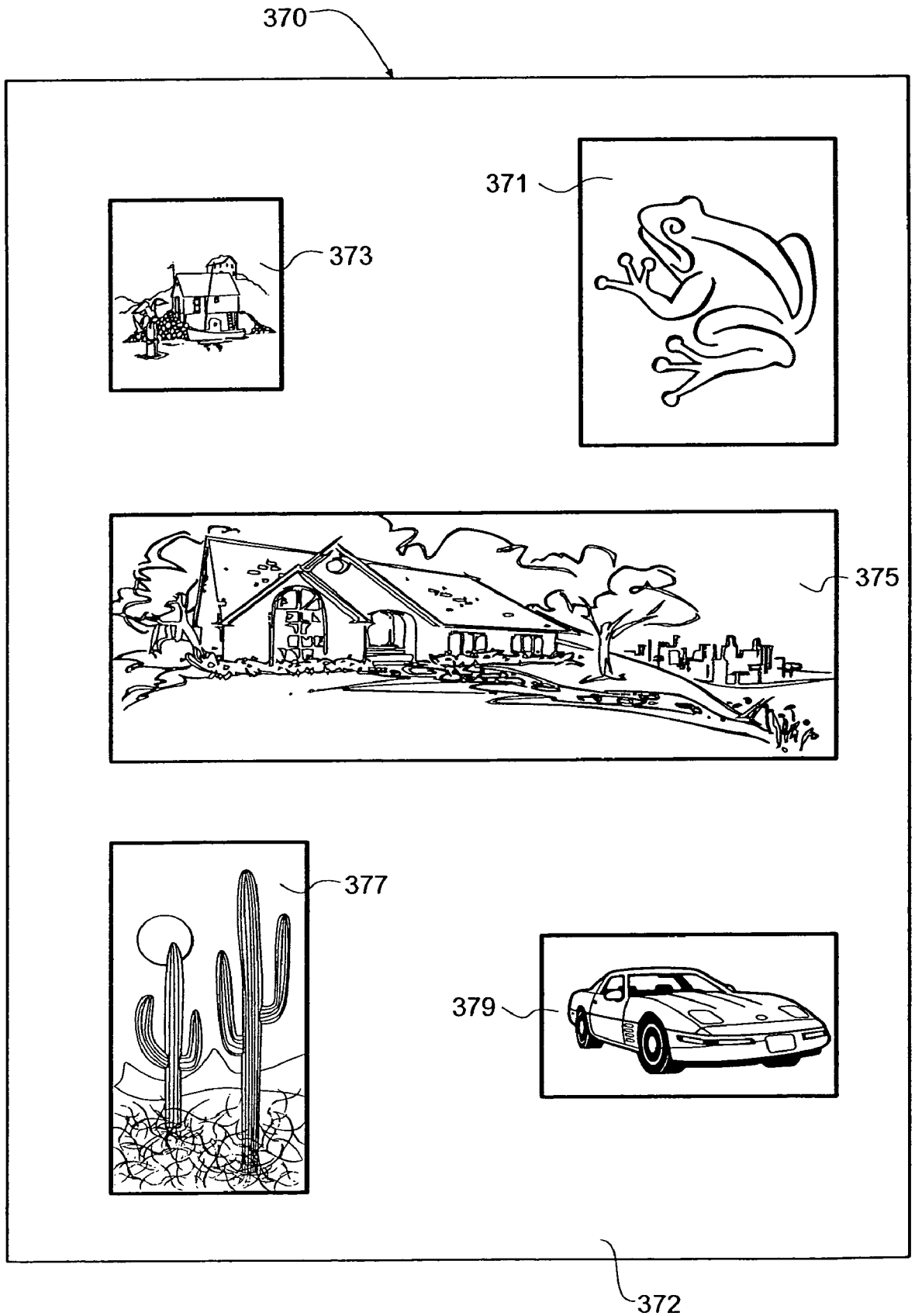
FIGS. 23A and 23B illustrate a plan view of an album page ordered in accordance with the present invention.
Figure 23B:
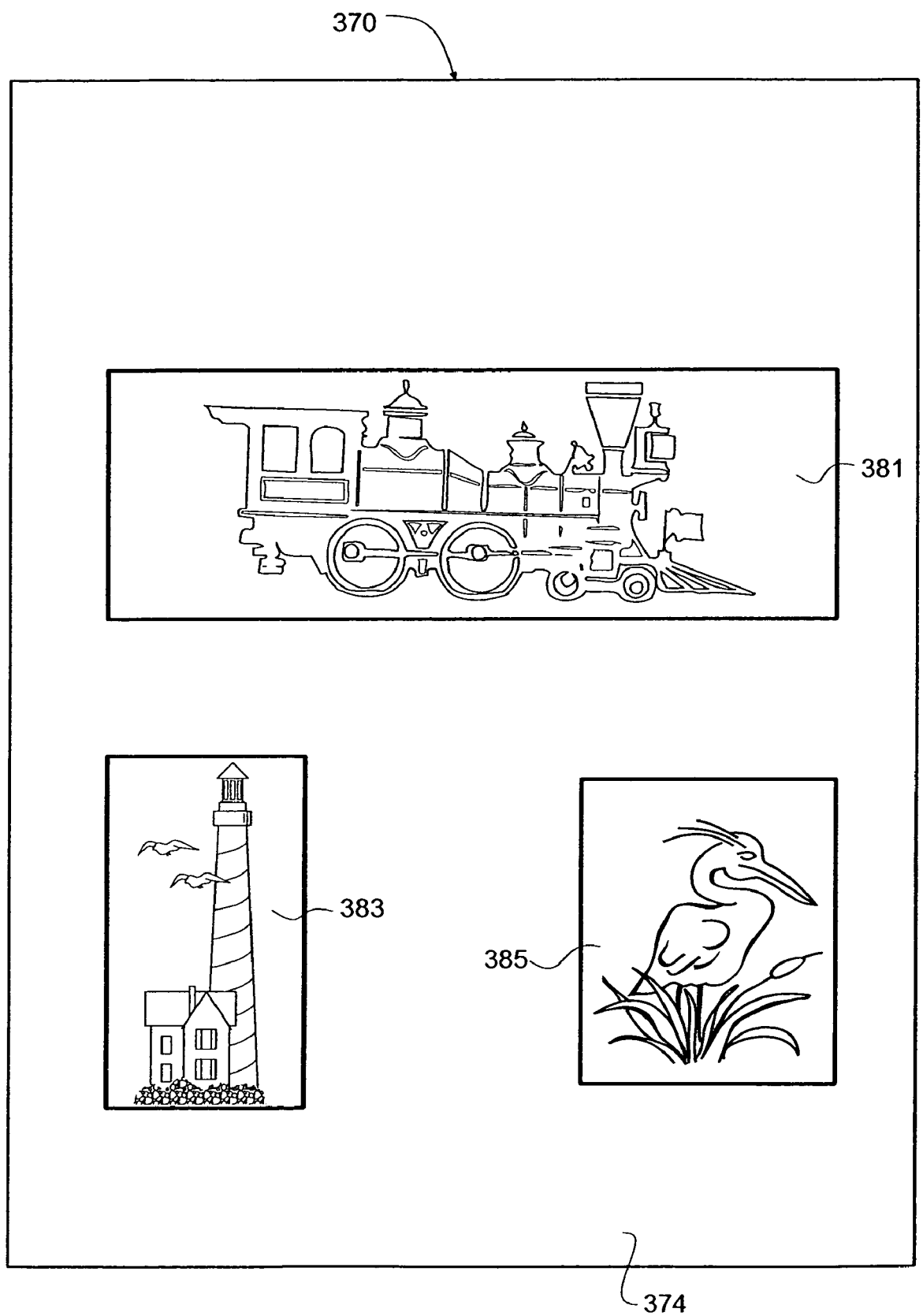

Referring to FIGS. 23A and 23B, there is illustrated an example of a product that may be provide. In particular there is illustrated an album page 370 produced in accordance with the present invention. FIG. 23A illustrates the front side 372 of the album page 370 whereas FIG. 23B illustrates the back side 374 of the album page 370. With respect to FIG. 23A it can be seen that five images 371. 373, 375, 377 and 379 of various size and shapes are provided thereon, whereas on the back side 374 a different number and plurality and shaped and sized images 381, 383, 385 are provided. It is however to be understood that any desired number of images and arrangements may be provided. In the particular embodiment illustrated in FIGS. 23A and 23B, these arrangements have been obtained by instructions provided by the customer in the initial organization. Optionally the sides of the album page may be automatically arranged.

The present invention may be used in a variety of different ways. For example, with regard to the system 330 illustrated in FIG. 22, the images after being sorted in accordance with the customer's wishes may be forwarded on to a server 350 and then forwarded on to the customer through the Internet and Internet Service Provider 354. For example, the captured images may be downloaded to the customer's computer in accordance with the instructions that have been programmed thereto. In certain situations, there may be little or no initial instructions provided by the customer with regard to the grouping of the images. By forwarding theses images to the customer, there is provided an opportunity for the customer to provide further groupings, modifications additional instructions. For example, should the customer desire that the images captured be placed in album pages, images forwarded to the customer, preferably in a low resolution mode so as to minimize the amount of information that needs to be sent to the customer. Appropriate algorithms (software programs) may be made available to the customer for use in manipulating the images, adding of text, and/or reorganizing of the images sent to the customer. The software may be downloaded directly to the computer at a customer site as a part of the original kit or alternatively the software may be provided by the server 350 with the images. Alternatively whereby the instructions may be provided to the customer whereby the customer simply will have access to the images stored at the service providers site using the software that resides at the server 350. Once the customer has finished providing additional instructions, grouping, manipulation, information, etc., the results are forwarded to the service provider for fulfillment. Appropriate software may also be sent to the customer so that the customer may know the cost of the goods and/or services being ordered. Preferably the cost would be displayed and adjusted in accordance with the current state of the customer's order. Additionally, previewing of a product, for example an album page, incorporating the selected images may be provided so that the customer can see what the product may look prior to actually ordering of the product. This allows the customer to make further enchantments and/or changes prior to actually placing the order.

A suitable organizational software is described in co-pending U.S. patent applications of Richard Simon, Ser. No. 09/559,478 filed Apr. 27, 2000, entitled "Method Of Organizing Digital Images On A Page" and of U.S. Ser. No. 09/640,938 now U.S. Pat. No. 6,810,149, filed Aug. 17, 2000 of John Squilla et. al., entitled "A Method And System For Cataloging Images" which are hereby incorporated by reference herein in their entirety. The Richard Simon application is directed to automatically formatting a plurality of images on a side of an album page and the John Squilla application is directed to organizing, retrieving and reorganizing of digital images. However, it is to be understood that any appropriate software program for organizing and/or reorganizing images may be appropriately used. The benefit of using the software provided in the co-pending applications is that it provides an easy and efficient manner in which consumers can readily identify, organize and later re-organize images.

In the previous embodiment the images are sent to a customer computer, however, access to the captured images may be provided by a computer or kiosk 313 at the retailer, service provider or at some other location. The kiosk 313 could be used in the same manner as discussed with the customer's computer. In this system, a customer order number could be used for controlled access to the image. The kiosk 313 could provide all of the same options for ordering and manipulation of the images. This system could provide a system which would not require the customer to have a computer. Additionally, a kiosk allows customer to do the ordering and manipulation while away from home, for example on vacation. Alternatively, other electronic devices could be used for accessing of the images, for example, a cable TV system whereby the customer could use the cable box and associated control as a means for accessing, manipulating and ordering.

Referring back to FIG. 22 the output of the server may also be provided to a review output device 380 which is provided internally of the image service provider 336. In particular, the images may be reviewed to make sure that the appropriate instructions have been implemented and/or to provide additional corrections or manipulations. In certain situations, it may not be possible to do automatically the organization required. In this case a professional may be provided to implement the instructions and organization or provide the goods and/or services requested by the customer. After this has been done, the information can then be sent back to the computer and then send out the appropriate output devices. After the product and/or goods and/or services are produced by output device 364 they are forwarded to the customer or to an identified party designated to receive the goods and/or services.

As illustrated, the customer or other third party may use the provided goods and/or services for re-ordering. In this regard, if the images have been saved in a data storage device such as 362, the images may be accessed through the Internet, whereby reorganization of the images may be obtained, including the total reorganization in accordance with the meta-data that is originally provided. If appropriate meta-data (information) has been associated with all of the images for multiple type meta-data it may be possible to reorganize the images to a variety of different output formats as desired by that particular customer or a particular occasion. For example, but not by way of limitation, if appropriate meta-data is provided with images identifying an item or individual in the image, the locations, event, various groupings of images can obviously be put together for organizing of the images to the custom desired. For example, if the third party is a related person, like son, daughter or grandparent etc. the images associated particularly or desired by that particular individual need be accessed and resorted on the basis of the criteria determined by that individual. It is obvious that a variety of different type criteria may be provided so as to reorganize the images already presently on file. This becomes of a relatively easy nature if the software provided is used as previously discussed.

With regard to the hard copy images that have been provided to the retailer, as previously discussed with regard to FIGS. 3-21, these images can be returned in the containers initially supplied. In addition information may be provided to the customer as to where the images are digitally stored for a pre-set period of time allowing the customer to again re-access and reorder goods and services as desired. Thus, making it easily for the customer for using these images and for further organization. Additionally, there is the ability of using the software previously discussed, for the customer to provide further meta-data with regard to the stored digital images so that the images can be further organized in more detail or using different sorting criteria.

In the case where the products are not hard copy product, but the providing of digital images in a digital format, for example but not by way of limitation, on a computer disk, a electronic computer file, in the form of an electronic mail, the information and organizational information provided by the information and instruction forms may be retained and associated with the images.

The invention has been described in detail with particular reference to certain preferred embodiments thereof, but it will be understood that variations and modifications can be effected within the scope of the invention. The present invention being defined by the claims set forth herein.

| PARTS LIST | |
|---|---|
| 14. | step |
| 16. | step |
| 18. | step |

| -continued | |
|---|---|
| PARTS LIST | |
| 20. | step |
| 22. | step |
| 24. | step |
| 26. | step |
| 28. | step |
| 30. | step |
| 40. | step |
| 42. | step |
| 44. | step |
| 46. | step |
| 48. | step |
| 50. | step |
| 52. | customer instruction sheet/form |
| 54. | information |
| 56. | order form |
| 58. | area |
| 60. | pre-printed label |
| 62. | machine readable barcode |
| 64. | first (upload) option |
| 66. | second (hard copy) option |
| 68. | third (CD) option |
| 70. | last (album pages) option |
| 72. | modified order form |
| 74. | image instruction form |
| 76. | machine readable code |
| 77. | human readable text |
| 78. | place |
| 80. | pre-printed sticker form |
| 82. | sticker icons |
| 83. | sticker icons |
| 84. | sticker icons |
| 86. | writing area |
| 88. | writing area |
| 89. | writing area |
| 90. | container |
| 92. | organizing holder |
| 93. | retaining section |
| 94. | retaining section |
| 95. | retaining section |
| 96. | retaining section |
| 97. | retaining section |
| 98. | retaining section |
| 99. | retaining section |
| 100. | retaining section |
| 101. | retaining section |
| 102. | print |
| 104. | pre-printed labels |
| 105. | envelope |
| 106. | container |
| 106A. | clear window |
| 108. | pocket |
| 110. | pocket |
| 112. | identification sheet |
| 113A. | identification sticker |
| 113B. | identification sticker |
| 114. | peel-off labels |
| 119. | modified kit |
| 120. | container |
| 122. | slidable support member |
| 124. | front panel |
| 126. | lid |
| 128. | second compartment |
| 130. | envelopes |
| 132. | labels/icons |
| 150. | kit |
| 152. | container |
| 154. | base portion |
| 156. | lid |
| 158. | compartment |
| 160. | compartment |
| 162. | top surface |
| 163. | retaining section |
| 164. | compartments |
| 168. | compartments |
| 170. | compartments |
| 172. | compartments |
| 174. | compartments |

-continued

| PARTS LIST | | |
|---|---|---|
| 176. | front panel | |
| 178. | identifying labels | |
| 180. | identifying labels | |
| 182. | area | |
| 184. | area | |
| 186. | handle | |
| 187. | locking mechanism | |
| 190. | container | |
| 194. | container | |
| 196. | container | |
| 200. | kit | |
| 202. | container | |
| 204. | container | |
| 205. | labels | |
| 206. | container | |
| 207. | readable code | |
| 208. | container | |
| 210. | machine readable code | |
| 212. | human readable counterpart | |
| 220. | container | |
| 222. | multiple hard copy prints/documents | |
| 224. | front panel | |
| 226. | back panel | |
| 228. | bottom panel | |
| 230. | side panel | |
| 232. | side panel | |
| 233. | opening | |
| 234. | information label | |
| 236. | removable guide | |
| 240. | scanner | |
| 242. | opening | |
| 250. | carrier sheet | |
| 252. | alignment mark | |
| 254. | alignment mark | |
| 256. | alignment marks | |
| 257. | light adhesive layer | |
| 260. | modified carrier | |
| 262. | retaining member | |
| 264. | top portion | |
| 266. | leading edge | |
| 270. | tool | |
| 280. | step | |
| 282. | step | |
| 284. | step | |
| 286. | step | |
| 288. | step | |
| 292. | selection boxes | |
| 300. | customer order form | |
| 320. | place in form | |
| 322. | machine readable codes | |
| 324. | order ID | |
| 326. | machine readable code | |
| 328. | send to address | |
| 329. | customer computer | |
| 330. | system | |
| 331. | numeral | |
| 332. | digital source/digital camera | |
| 333. | kiosk | |
| 334. | retailer | |
| 336. | image service provider | |
| 340. | scanner | |
| 342. | central computer | |
| 350. | server | |
| 352. | internet | |
| 354. | internet service provider | |
| 356. | customer | |
| 360. | image data manager | |
| 362. | data storage memory device | |
| 364. | output device | |
| 370. | album page | |
| 371. | image | |
| 372. | front side | |
| 373. | image | |
| 374. | back side | |
| 375. | image | |
| 377. | image | |
| 379. | image | |

-continued

| PARTS LIST | | |
|---|---|---|
| 380. | review | |
| 381. | image | |
| 382. | image | |
| 383. | image | |
| 385. | image | |
| 402. | list | |

What is claimed is:

1. A method of automatically organizing digital images obtained from a plurality of hard copy prints, each of said hard copy prints having an image thereon, comprising the steps of:

digitally scanning a plurality of hard copy prints that have been grouped into one or more categories, each category separated by an associated machine readable instruction form as to obtain a digital file of each of said images and digitally associating said one or more categories with said digital images in accordance with said associated machine readable instruction form executed by a computer;

storing said digital images files and associated categories on a digital storage medium; and producing a product incorporating images from one or more of said categories as requested by a customer.

2. A method according to claim 1 wherein said product comprises an album page.

3. A method according to claim 1 wherein said product comprises a computer storage media having said images.

4. A method according to claim 3 wherein said storage media comprises a CD.

5. A method according to claim 1 wherein said product comprises a digital image file containing said image.

6. A method according to claim 1 further comprising providing instructions on said machine readable instruction form relating to said ordering of said product.

7. A method according to claim 6 wherein said instruction provides additional information as said images.

8. A method according to claim 6 wherein said instruction provides personal information about at least one of said images.

9. A method according to claim 1 further comprising providing a product or service created from said at least one of the plurality of modified digital image files.

10. A method of organizing a plurality of images provided on a plurality of separate hard copy prints, comprising the steps of:

scanning a plurality of hard copy prints that have been provided in a desired order and having at least one instruction form place in association with a ground of said plurality of hard copy prints so as to obtain a digital record of said images on said hard copy prints and a digital record of information provided on said instruction form; and combining said digital record of said images with said digital record of said information provided on said instruction form to produce a plurality of modified digital image files.

11. A method according to claim 10 wherein said instructions and modified digital images files are accessed by a computer wherein said instructions are implemented by said computer with respect to said images.

12. A method according to claim 10 further comprising the step of:
   providing at least one good and/or service in accordance with said instructions.

13. A method according to claim 10 wherein said instruction is provided in the form of an icon.

14. A method according to claim 13 wherein said icon is provided on a sticker.

15. A method according to claim 12 wherein said icon is automatically associated by said scanner with respect to a particular instruction and/or information.

16. A method according to claim 10 wherein said instruction form includes at least one machine readable instruction.

17. A method according to claim 10 further comprising the step of searching said images using said information provided on said instruction form.

18. A method of automatically organizing digital images obtained from a plurality of hard copy prints, comprising the steps of:

obtaining hard copy prints from a plurality of different sources, each of said hard copy prints having an image thereon;

digitally scanning a plurality of hard copy prints each having an image thereon wherein said plurality of hard copy prints have been grouped together into one or more categories, each category being associated with an instruction form to create digital image files of said images and obtaining associated category information for said digital images in accordance with said machine readable instruction executed by a computer;

automatically grouping said digital image files into said categories in accordance with said instruction; and storing the digital image files and said associated category on a digital storage medium.

* * * * *

UNITED STATES PATENT AND TRADEMARK OFFICE
CERTIFICATE OF CORRECTION

PATENT NO. : 7,260,587 B2  
APPLICATION NO. : 10/744537  
DATED : August 21, 2007  
INVENTOR(S) : Carl A. Testa et al.

Page 1 of 1

It is certified that error appears in the above-identified patent and that said Letters Patent is hereby corrected as shown below:

Column 21, Claim 15    Please delete "12" and insert --13--.

Signed and Sealed this

Fifteenth Day of April, 2008

JON W. DUDAS  
*Director of the United States Patent and Trademark Office*

(12) POST-GRANT REVIEW CERTIFICATE (12th)
United States Patent
Testa et al.

(10) Number: US 7,260,587 J1
(45) Certificate Issued: Jan. 15, 2016

(54) METHOD FOR ORGANIZING DIGITAL IMAGES

(75) Inventors: Carl A. Testa; Andrew Sailus; Kenneth D. Corby; Leanne M. Capozzi; Dale F. McIntyre; Joseph A. Manico

(73) Assignee: INTELLECTUAL VENTURES II LLC

Trial Number:

CBM2014-00033 filed Nov. 12, 2013

Petitioner: Bank of America, N.A.

Patent Owner: Intellectual Ventures II LLC

Post-Grant Review Certificate for:

Patent No.: 7,260,587
Issued: Aug. 21, 2007
Appl. No.: 10/744,537
Filed: Dec. 22, 2003

The results of CBM2014-00033 are reflected in this post-grant review certificate under 35 U.S.C. 328(b).

POST-GRANT REVIEW CERTIFICATE
U.S. Patent 7,260,587 J1
Trial No. CBM2014-00033
Certificate Issued Jan. 15, 2016

AS A RESULT OF THE POST-GRANT REVIEW PROCEEDING, IT HAS BEEN DETERMINED THAT:

Claims 1-18 are cancelled.

\* \* \* \* \*